United States Patent
Yao et al.

(10) Patent No.: US 12,038,382 B2
(45) Date of Patent: Jul. 16, 2024

(54) METHOD, SYSTEM AND APPLICATION FOR 3D MOLECULAR DIFFUSION TENSOR MEASUREMENT AND STRUCTURAL IMAGING

(71) Applicant: CLEMSON UNIVERSITY, Clemson, SC (US)

(72) Inventors: Hai Yao, Clemson, SC (US); Tong Ye, Clemson, SC (US); Peng Chen, Clemson, SC (US); Xun Chen, Clemson, SC (US)

(73) Assignee: CLEMSON UNIVERSITY RESEARCH FOUNDATION, Clemson, SC (US)

( * ) Notice: Subject to any disclaimer, the term of this patent is extended or adjusted under 35 U.S.C. 154(b) by 544 days.

(21) Appl. No.: 17/378,093

(22) Filed: Jul. 16, 2021

(65) Prior Publication Data
US 2022/0018779 A1   Jan. 20, 2022

Related U.S. Application Data

(60) Provisional application No. 63/052,726, filed on Jul. 16, 2020.

(51) Int. Cl.
*G01N 21/64* (2006.01)
*G02B 21/00* (2006.01)
*G06T 7/00* (2017.01)

(52) U.S. Cl.
CPC ..... *G01N 21/6486* (2013.01); *G01N 21/6458* (2013.01); *G02B 21/0032* (2013.01); *G02B 21/0076* (2013.01); *G02B 21/008* (2013.01); *G06T 7/0016* (2013.01); *G01N 2201/0635* (2013.01)

(58) Field of Classification Search
CPC .......... G01N 21/6486; G01N 21/6458; G02B 21/0032
See application file for complete search history.

(56) References Cited

U.S. PATENT DOCUMENTS

| | | |
|---|---|---|
| 8,547,634 B2 | 10/2013 | Power et al. |
| 10,012,826 B2 | 7/2018 | Knebel et al. |
| 10,983,322 B2 | 4/2021 | Kalkbrenner et al. |
| 2005/0122579 A1* | 6/2005 | Sasaki ................ G02B 21/0044 359/385 |

(Continued)

OTHER PUBLICATIONS

Rodrigues et al. (Convex Total Variation Denoising of Poisson Fluorescence Confocal Images with Anisotropic Filtering, IEEE Transactions on Image Processing, vol. 20, No. 1, Jan. 2011)("Rodrigues") (Year: 2011).*

(Continued)

*Primary Examiner* — Hugh Maupin
(74) *Attorney, Agent, or Firm* — DORITY & MANNING, P.A.

(57) ABSTRACT

Herein are described data acquisition systems and methods applying such systems to determine three-dimensional (3D) diffusion tensors, and simultaneously, to perform 3D structure imaging. Example data acquisition systems can include computing systems in communication with modified light sheet microscopes that are configured for high-speed volumetric imaging to record 3D diffusion processes and high-resolution 3D structural imaging.

22 Claims, 21 Drawing Sheets

(56) References Cited

U.S. PATENT DOCUMENTS

| | | | |
|---|---|---|---|
| 2011/0208478 | A1* | 8/2011 | Wagner-Conrad .......................... G02B 21/0076 702/179 |
| 2016/0048012 | A1 | 2/2016 | Knebel et al. |
| 2019/0265454 | A1 | 8/2019 | Kalkbrenner et al. |
| 2023/0080237 | A1* | 3/2023 | Mehta .................... G02B 21/16 250/252.1 |

OTHER PUBLICATIONS

Allied Market Research. "Cartilage Repair Market: Global Opportunity Analysis and Industry Forecast, 2018-2025" (2019) p. 1. (Abstract only).

Axelrod, et al. "Mobility measurement by analysis of fluorescence photobleaching recovery kinetics" *Biophys. J.* 16 (1976) pp. 1055-1069.

Basser, et al. "Microstructural and physiological features of tissues elucidated by quantitative-diffusion-tensor MRI" *J. Magn. Reson. B* 111 (1996) pp. 209-219.

Beshtawi, et al. "Biomechanical properties of corneal tissue after ultraviolet-A-riboflavin crosslinking" *J. Cataract Refract. Surg.* 39 (2013) pp. 451-462.

Bläßle, et al. "Quantitative diffusion measurements using the open-source software PyFRAP" *Nat. Commun.* 9:1582 (2018) pp. 1-14.

Bonnans, et al. "Remodelling the extracellular matrix in development and disease" *Nat. Rev. Mol. Cell Biol.* 15 (2014) pp. 786-801.

Braeckmans, et al. "Line FRAP with the confocal laser scanning microscope for diffusion measurements in small regions of 3-D samples" *Biophys. J.* 92 (2007) pp. 2172-2183.

Braeckmans, et al. "Three-dimensional fluorescence recovery after photobleaching with the confocal scanning laser microscope" *Biophys. J.* 85 (2003) pp. 2240-2252.

Brown, et al. "Measurement of molecular diffusion in solution by multiphoton fluorescence photobleaching recovery" *Biophys. J.* 77 (1999) pp. 2837-2849.

Charalel, et al. "Diffusion of protein through the human cornea" *Ophthal. Res.* 48 (2012) pp. 50-55.

Chou, et al. "Role of solvent-mediated carbodiimide cross-linking in fabrication of electrospun gelatin nanofibrous membranes as ophthalmic biomaterials" *Mater. Sci. Eng. C* 71 (2017) pp. 1145-1155.

Crank, J. "The Mathematics of Diffusion" *Oxford University Press* (1975) pp. 1-421.

Crick, F. "Diffusion in embryogenesis" *Nature* 225 (1970) pp. 420-422.

Cui, et al. "Chronic inflammation deteriorates structure and function of collagen fibril in rat temporomandibular joint disc" *Int'l J. Oral. Sci.* 11 (2019) pp. 1-8.

Datta, et al. "Anisotropy properties of tissues: A basis for fabrication of biomimetic anisotropic scaffolds for tissue engineering" *J. Bionic Eng.* 16 (2019) pp. 842-868. (Abstract only).

Deschout, et al. "FRAP in pharmaceutical research: practical guidelines and applications in drug delivery" *Pharm. Res.* 31 (2014) pp. 255-270.

Deschout, et al. "Straightforward FRAP for quantitative diffusion measurements with a laser scanning microscope" *Opt. Expr.* 18 (2010) pp. 22886-22905.

Didomenico, et al. "Molecular transport in articular cartilage—what have we learned from the past 50 years?" *Nat. Rev. Rheumatol.* 14 (2018) pp. 393-403.

Ducros, et al. "Lattice light sheet microscopy and photo-stimulation in brain slices" *Proc. SPIE* 10865 (2019) pp. 1-7.

Einstein, A. "On the movement of small particles suspended in stationary liquids required by the molecular-kinetic theory of heat" *Ann. der physik* 17 (1905) pp. 549-560.

Erencia, et al. "Electrospinning of gelatin fibers using solutions with low acetic acid concentration: Effect of solvent composition on both diameter of electrospun fibers and cytotoxicity" *J. Appl. Polym. Sci.* 132:42115 (2015) pp. 1-11.

Garcia, et al. "Transport and binding of insulin-like growth factor I through articular cartilage" *Arch. Biochem. Biophys.* 415 (2003) pp. 69-79.

Geiger, et al. "Anomalous diffusion characterization by Fourier transform-FRAP with patterned illumination" *Biophys. J.* 119 (2020) pp. 737-748.

Goldring, et al. "Changes in the osteochondral unit during osteoarthritis: structure, function and cartilage-bone crosstalk" *Nat. Rev. Rheumatol.* 12 (2016) pp. 632-644.

Hepfer, et al. "The impact of heat treatment on porcine heart valve leaflets" *Cardiovasc. Eng. Technol.* 9 (2018) pp. 32-41.

Hepfer, et al. "Corneal crosslinking: engineering a predictable model" *Crit. Rev. Biomed. Eng.* 42 (2014) pp. 229-248. (Abstract only).

Ho, et al. "Non-invasive MRI assessments of tissue microstructures and macromolecules in the eye upon biomechanical or biochemical modulation" *Sci. Rep.* 6:32080 (2016) pp. 1-14.

Hovhannisyan, et al. "Elucidation of the mechanisms of optical clearing in collagen tissue with multiphoton imaging" *J. Biomed. Opt.* 18:046004 (2013) pp. 1-8.

Huang, et al. "Intervertebral disc regeneration: do nutrients lead the way?" *Nat. Rev. Rheumatol.* 10 (2014) pp. 561-566.

Huisken, et al. "Optical sectioning deep inside live embryos by selective plane illumination microscopy" *Science* 305 (2004) pp. 1007-1009.

Jackson, et al. "Effect of compression and anisotropy on the diffusion of glucose in annulus fibrosus" *Spine* 33 (2008) pp. 1-7.

Jackson, et al. "Anisotropic ion diffusivity in intervertebral disc: an electrical conductivity approach" *Spine* 31 (2006) pp. 2783-2789.

Jain, et al. "Delivering nanomedicine to solid tumors" *Nat. Rev. Clin. Oncol.* 7 (2010) pp. 653-664.

Jana, et al. "Anisotropic materials for skeletal muscle-tissue engineering" *Adv. Mater.* 28 (2016) pp. 10588-10612.

Jester, et al. "Evaluating corneal collagen organization using high resolution nonlinear optical macroscopy" *Eye Cont. Lens* 36 (2010) pp. 260-264.

Junqueira, et al. "Picrosirius staining plus polarization microscopy, a specific method for collagen detection in tissue sections" *Histochem. J.* 11 (1979) pp. 447-455.

Kim, et al. "Anisotropically organized three-dimensional culture platform for reconstruction of a hippocampal neural network" *Nat. Commun.* 8:14346 (2017) pp. 1-16.

Kim, et al. "Independent control of topography for 3D patterning of the ECM microenvironment" *Adv. Mater.* 28 (2016) pp. 132-137.

Komai, et al. "The three-dimensional organization of collagen fibrils in the human cornea and sclera" *Invest. Ophthal. Vis. Sci.* 32 (1991) pp. 2244-2258.

Le Bihan, et al. "Diffusion tensor imaging: concepts and applications" *J. Magn. Reson Imag.* 13 (2001) pp. 534-546.

Leddy, et al. "Diffusional anisotropy in collagenous tissues: fluorescence imaging of continuous point photobleaching" *Biophys. J.* 91 (2006) pp. 311-316.

Leddy, et al. "Molecular diffusion in tissue engineered cartilage constructs: Effects of scaffold material, time, and culture conditions" *J. Biomed. Mater. Res. B* 70 (2004) pp. 397-406.

Levesque, et al. "Macroporous interconnected dextran scaffolds of controlled porosity for tissue-engineering applications" *Biomaterials* 26 (2005) pp. 7436-7446.

Li, et al. "Near-infrared excitation/emission and multiphoton-induced fluorescence of carbon dots" *Adv. Mater.* 30:e1705913 (2018) pp. 1-8.

Li, et al. "Photoacoustic recovery after photothermal bleaching in living cells" *J. Biomed. Opt.* 18:106004 (2013) pp. 1-5.

Lim, et al. "Achieving 3D FRAP using multiphoton polygon scanning microscopy" *Proc. SPIE* 11202 (2019) pp. 1-17. (Abstract only).

Linninger, et al. "Computational methods for predicting drug transport in anisotropic and heterogeneous brain tissue" *J. Biomech.* 41 (2008) pp. 2176-2187.

Lippincott-Schwartz, et al. "Studying protein dynamics in living cells" *Nat. Rev. Mol. Cell Biol.* 2 (2001) pp. 444-456.

(56) References Cited

OTHER PUBLICATIONS

Lorén, et al. "Fluorescence recovery after photobleaching in material and life sciences: putting theory into practice" *Q. Rev. Biophys.* 48 (2015) pp. 323-387.
Markets and Markets. "Drug Delivery Technologies Market—(Metered Dose Inhalers, Needle-Free Injectors, Auto-Injectors, Nasal Sprays, Transdermal Patches, Nebulizers, Infusion Pumps, Drug Eluting Stents, Sustained Release, Ocular Implants)—Global Forecasts To 2026" *MarketsandMarkets* (2017) pp. 1-9. (Abstract only).
Market Watch. "Global Keratoconus Treatment Market: Information by Keratoconus Type (Corneal Hydrops, Forme Fruste Keratoconus, Posterior Keratoconus, Keratoglobus, Pellucid Marginal Degeneration), Treatment Type (Lenses, Surgery, Corneal Cross-Linking), End User (Eye Clinics, Hospitals, and Others), Region (Americas, Europe, Asia-Pacific, and Middle East & Africa)—Forecast till 2027" *MW MarketWatch* (2019) pp. 1-11. (Abstract only).
Marks, et al. "Diffusion tensor optical coherence tomography" *Phys. Med. Biol.* 63:025007 (2018).
Mazza, et al. "A new FRAP/FRAPa method for three-dimensional diffusion measurements based on multiphoton excitation microscopy" *Biophys. J.* 95 (2008) pp. 3457-3469.
Mickoleit, et al. "High-resolution reconstruction of the beating zebrafish heart" *Nat. Meth.* 11 (2014) pp. 919-922.
Mori, et al. "Principles of diffusion tensor imaging and its applications to basic neuroscience research" *Neuron* 51 (2006) pp. 527-539.
Müller, et al. "Differential diffusivity of Nodal and Lefty underlies a reaction diffusion patterning system" *Science* 336 (2012) pp. 721-724.
Mulyasasmita, et al. "Avidity-controlled hydrogels for injectable co-delivery of induced pluripotent stem cell-derived endothelial cells and growth factors" *J. Contr. Rel.* 191 (2014) pp. 71-81.
Netti, et al. "Role of extracellular matrix assembly in interstitial transport in solid tumor" *Canc. Res.* 60 (2000) pp. 2497-2503.
Pansare, et al. "Review of long wavelength optical and NIR imaging materials: contrast agents, fluorophores and multifunctional nano carriers" *Chem. Mater.* 24 (2012) pp. 812-827.
Papadopoulos, et al. "Extracellular space diffusion in central nervous system: anisotropic diffusion measured by elliptical surface photobleaching" *Biophys. J.* 89 (2005) pp. 3660-3668.
Polaris Market Research. "Scaffold Technology Market Share, Size, Trends, Industry Analysis Report: By Type (Hydrogels, Polymeric Scaffolds, Micropatterned Surface Microplates, Nanofiber Based Scaffolds); By Application; By Disease Type; By End-Use; By Regions; Segment Forecast, 2021-2028" *Polaris Mark. Res.* (2016) pp. 1-4. (Abstract only).
Prince, et al. "Design and applications of man-made biomimetic fibrillar hydrogels" *Nat. Rev. Mater.* 4 (2019) pp. 99-115.
Rajapakshal, et al. "Size-dependent diffusion of dextrans in excised porcine corneal stroma" *Mol. Cell Biomech.* 12 (2015) pp. 215-230.
Rice, et al. "Anisotropic and heterogeneous diffusion in the turtle cerebellum: implications for volume transmission" *J. Neurophysiol.* 70 (1993) pp. 2035-2044. (Abstract only).
Rieckher, et al. "A customized light sheet microscope to measure spatiotemporal protein dynamics in small model organisms" *PLoS One* 10:e0127869 (2015) pp. 1-15.
Shi, et al. "Measurement of three dimensional anisotropic diffusion by multiphoton fluorescence recovery after photobleaching" *Ann. Biomed. Eng.* 42 (2014) pp. 555-565.
Shi, et al. "Relationship between anisotropic diffusion properties and tissue morphology in porcine TMJ disc" *Osteoarthr. Cartil.* 21 (2013) pp. 625-633.
Shi, et al. "Anisotropic solute diffusion tensor in porcine TMJ discs measured by FRAP with spatial Fourier analysis" *Ann. Biomed. Eng.* 38 (2010) pp. 3398-3408.
Stelzer, E.K.H. "Light-sheet fluorescence microscopy for quantitative biology" *Nat. Meth.* 12 (2015) pp. 23-26.
Strnad, et al. "Inverted light-sheet microscope for imaging mouse preimplantation development" *Nat. Meth.* 13 (2016) pp. 139-142.
Stylianopoulos, et al. "Diffusion anisotropy in collagen gels and tumors: the effect of fiber network orientation" *Biophys. J.* 99 (2010) pp. 3119-3128.
Thiagarajah, et al. "Slowed diffusion in tumors revealed by microfiberoptic epifluorescence photobleaching" *Nat. Meth.* 3 (2006) pp. 275-280.
Thorne, et al. "In vivo diffusion of lactoferrin in brain extracellular space is regulated by interactions with heparan sulfate" *PNAS* 105 (2008) pp. 8416-8421.
Torbet, et al. "Orthogonal scaffold of magnetically aligned collagen lamellae for corneal stroma reconstruction" *Biomaterials* 28 (2007) pp. 4268-4276.
Travascio, et al. "Simultaneous measurement of anisotropic solute diffusivity and binding reaction rates in biological tissues by FRAP" *Ann. Biomed. Eng.* 39 (2011) pp. 53-65.
Travascio, et al. "Characterization of anisotropic diffusion tensor of solute in tissue by video-FRAP imaging technique" *Ann. Biomed. Eng.* 37 (2009) pp. 813-823.
Travascio, et al. "Anisotropic diffusive transport in annulus fibrosus: experimental determination of the diffusion tensor by FRAP technique" *Ann. Biomed. Eng.* 35 (2007) pp. 1739-1748.
Truong, et al. "Deep and fast live imaging with two-photon scanned light-sheet microscopy" *Nat. Meth.* 8 (2011) pp. 757-760.
Tsay, et al. "Spatial Fourier analysis of video photobleaching measurements. Principles and optimization" *Biophys. J.* 60 (1991) pp. 360-368.
Wagner, et al. "Instantaneous isotropic volumetric imaging of fast biological processes" *Nat. Meth.* 16 (2019) pp. 497-500.
Wang, et al. "Light-sheet microscopy in the near-infrared II window" *Nat. Meth.* 16 (2019) pp. 545-552.
Wollensak, et al. "Riboflavin/ultraviolet-a-induced collagen crosslinking for the treatment of keratoconus" *Am. J. Ophthal.* 135 (2003) pp. 620-627.
Wu, et al. "Region and strain-dependent diffusivities of glucose and lactate in healthy human cartilage endplate" *J. Biomech.* 49 (2016) pp. 2756-2762.
Yu, et al. "Fgf8 morphogen gradient forms by a source-sink mechanism with freely diffusing molecules" *Nature* 461 (2009) pp. 533-536.
Zhan, et al. "Effect of tissue permeability and drug diffusion anisotropy on convection-enhanced delivery" *Drug Deliv.* 26 (2019) pp. 773-781.
Zhu, et al. "Modelling intravascular delivery from drug-eluting stents with biodurable coating: investigation of anisotropic vascular drug diffusivity and arterial drug distribution" *Comput. Meth. Biomech. Biomed. Eng.* 17 (2014) pp. 187-198.

\* cited by examiner

FIG. 3C  FIG. 3D

METHOD, SYSTEM AND APPLICATION FOR 3D MOLECULAR DIFFUSION TENSOR MEASUREMENT AND STRUCTURAL IMAGING

CROSS REFERENCE TO RELATED APPLICATION

This application claims filing benefit of U.S. Provisional Patent Application Ser. No. 63/052,726, having a filing date Jul. 16, 2020, which is incorporated herein by reference in its entirety.

STATEMENT REGARDING FEDERALLY SPONSORED RESEARCH OR DEVELOPMENT

This invention was made with Government support under Contract Nos. R01DE021134, P20GM121342, and R21GM104683, awarded by the National Institutes of Health (NIH). The Government has certain rights in the invention.

BACKGROUND

Currently, the precise extracellular diffusion behavior of most molecules remains largely unknown due to the inability to noninvasively measure their extracellular three-dimensional (3D) diffusion tensors. For most biorelevant molecules, a common practice for measuring 3D diffusion involves dissecting tissues along different orientations, conducting diffusion measurements on each section using one-dimensional (1D) or two-dimensional (2D) approaches, then reconstructing the 3D diffusion tensor from the cross-sectional measurements. However, invasive dissection procedures damage tissue integrity and release physiological mechanical stress stored in the extracellular matrix network that can drastically alter tissue structure, and thereby, extracellular biomolecule diffusion. Such is the case for example in extracellular diffusion measurement in cornea tissues (large avascular tissue), which has gained controversy due to conflicting results. 3D diffusion measurements in excised cornea tissues using 2D fluorescence correlation spectroscopy exhibited isotropic extracellular diffusion. Conversely, in situ MRI-based 3D diffusion tensor imaging of intact ovine corneas reported anisotropic extracellular diffusion. This discrepancy may be explained by the structural changes caused by dissection. Under physiological conditions, cornea tissues exhibit well-organized lamellae collagen fiber structures and are subject to tensile stress exerted by intraocular pressure. When performing invasive diffusion measurements on excised cornea tissue, such as with 2D fluorescence correlation spectroscopy, dissecting the cornea unwittingly releases mechanical stress. The resulting severely crimped and disorganized matrix structures cause loss of diffusion anisotropy due to altered tissue structure, a consequence that may explain past contradictory findings. This highlights the need for a noninvasive approach to measure 3D anisotropic diffusion. Two noninvasive methods are currently available—MRI-based diffusion tensor imaging (broadly used in brain imaging) and diffusion tensor optical coherence tomography—but their use is limited to only water molecules or large scattering nanoparticles, respectively. Therefore, to accurately assess 3D extracellular diffusion of a range of biorelevant molecules, new tools are needed for noninvasive 3D measurement.

SUMMARY

The present disclosure is directed to systems and methods that can be used to determine the full 3D diffusion tensor for materials and components of materials, e.g., diffusive molecular species within materials, and that can be used to capture 3D images of molecules present in the materials and/or to characterize structural anisotropy (e.g., using structure imaging). An example system can include a 3D imaging microscope, such as a 3D light sheet microscope, having one or more lasers and one or more sensors. The one or more lasers can be configured to generate a first beam transmitted along an illumination path and a second beam transmitted along a bleaching path. The illumination path can direct the first beam to irradiate a 3D volume of a sample area, e.g., in the form of a light sheet, and the bleaching path can direct the second beam to bleach a portion of the 3D volume based on a position of a detection objective. The one or more sensors can be configured to detect an emission wavelength emitted within the 3D volume that can be recorded for further processing such as image processing and analysis.

In some implementations, the illumination path can include a beam scanning system (e.g., a MEMS mirror) for projecting the first beam to generate the 3D volume.

In some implementations, the sample area can include a material that has or incorporates an excitable molecule and the illumination path directs the first beam to irradiate the 3D volume of the material and diffusive molecules within the materials. In this manner, the excitable molecules can be exposed to irradiation from the first beam and can generate an emission wavelength, e.g., via fluorescence, that can be detected at the sensor.

In certain implementations, the system (e.g., a data acquisition system configured to irradiate and detect emission over a volume of a sample) can include one or more shutters that can have adjustable operation states that can allow the shutters to prevent or allow transmission of the first beam and/or the second beam to the sample area.

For certain implementations of the present disclosure, the data acquisition system can include, or otherwise be in communication with, a computing system. The computing system can include one or more processors and memory, the memory including one or more non-transitory computer-readable memories that together store instructions that, when executed by the one or more processors, cause the computing system to perform operations. Some example operations can include initiating a laser to emit the laser beam; acquiring a plurality of image data descriptive of the emission wavelength emitted by the 3D volume at a plurality of time points; processing the plurality of image data by performing a 3D spatial Fourier analysis; and determining, based at least in part on the 3D spatial Fourier analysis, a 3D diffusion tensor.

In some implementations, acquiring the plurality of image data descriptive of the emission wavelength emitted by the 3D volume at a plurality of time points can include communicating a request to the 3D microscope to perform acquisition operations, such as projecting the first beam as a 2D light plane; scanning the 2D light plane along an orthogonal direction to generate the 3D volume; bleaching a portion of the 3D volume by focusing the second beam on the portion of the 3D volume; and acquiring a plurality of image frames by the sensor that together include data descriptive of the emission wavelength emitted by the 3D volume. For the image frames, each image frame of the plurality of image frames can include an array of pixels, each associated with an intensity.

In certain implementations, the acquisition operations can also include recording one or more pre-bleaching volumes by acquiring the plurality of image frames by the sensor that together include data descriptive of the emission wavelength emitted by the 3D volume prior to bleaching the portion of the 3D volume; recording one or more bleaching volumes by acquiring the plurality of image frames by the sensor that together include data descriptive of the emission wavelength emitted by the 3D volume during bleaching of a portion of the 3D volume; and recording one or more post-bleaching volumes by acquiring the plurality of image frames by the sensor that together include data descriptive of the emission wavelength emitted by the 3D volume after bleaching the portion of the 3D volume. The system can also provide for fast transitions between the acquisition of pre-bleaching volumes, bleaching, and acquisition of post-bleaching volumes. Though not required, for some of these implementations, processing the plurality of image data can include determining a normalized image volume by adjusting the intensity of each pixel for each of the one or more post-bleaching volumes based on a corresponding pre-bleaching volume. Further, in some implementations, processing the plurality of image data by performing a 3D spatial Fourier analysis can include only performing the 3D spatial Fourier analysis using the normalized image volume.

For example, in some implementations of the present disclosure, the data acquisition system can be configured to direct the first beam to irradiate the 3D volume at a rate of between about 1 volume/second and about 10 volumes/second, though slower or faster rates can be utilized in some embodiments. For instance, slower volume rates may be preferred in embodiments for examining slow diffusion of molecules.

Using example systems and methods of the present disclosure, a full 3D diffusion tensor can be determined for excitable molecules.

In certain example data acquisition systems, the detection objective can be mounted on a stage that can be configured to adjust the focus of the detection objective by translating the detection objective along at least one direction.

For some implementations, the data acquisition system can also include an imaging unit, e.g., a non-linear optical imaging unit, such as a second harmonic generation (SHG) unit, a third harmonic generation unit (THG), autofluorescence, routine fluorescence imaging, scattering-based signals, among others, as well as combinations of imaging units for performing 3D structural imaging of materials. A non-linear optical imaging unit can be configured to use a different laser (or multiple lasers) other than the one or more lasers configured to generate the first beam and/or the second beam. Alternatively, a non-linear optical imaging unit may use the same laser as the one or more lasers configured to generate the first beam and/or the second beam.

Implementations of the present disclosure can also include non-invasive, computer-implemented methods for determining the 3D diffusion tensor for a molecule in a material. Aspects of these computer-implemented methods can include obtaining, by one or more computing devices, a plurality of image data for a volume of the material, wherein the plurality of image data is descriptive of an emission wavelength generated by the molecule after exposure to an irradiation wavelength and/or exposure to a bleaching wavelength; processing, by the one or more computing devices, the plurality of image data by performing a 3D spatial Fourier analysis; and determining, by the one or more computing devices and based at least in part on the 3D spatial Fourier analysis, the 3D diffusion tensor.

In some implementations, obtaining, by the one or more computing devices, the plurality of image data may include scanning, by the one or more computing devices, the material with a 2D beam at the irradiation wavelength along an orthogonal direction over the volume of the material; and recording, by the one or more computing devices, the emission wavelength generated by the molecules after exposure to the irradiation wavelength.

For implementations of the present disclosure, the material to be characterized can be derived from a biological organism, biomaterials and/or solutions, and the molecule can include a fluorescing group (e.g., a portion of the molecules that emits fluorescence upon excitation by radiation).

In some implementations, obtaining, by the one or more computing devices, the plurality of image data for the volume of the material can include communicating instructions over a network to a data acquisition system that includes a 3D light sheet microscope.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which:

FIG. 3C illustrates one artificial scaffold produced according to example aspects of the present disclosure.

FIG. 3D illustrates another artificial scaffold produced according to example aspects of the present invention.

Figure 1A:
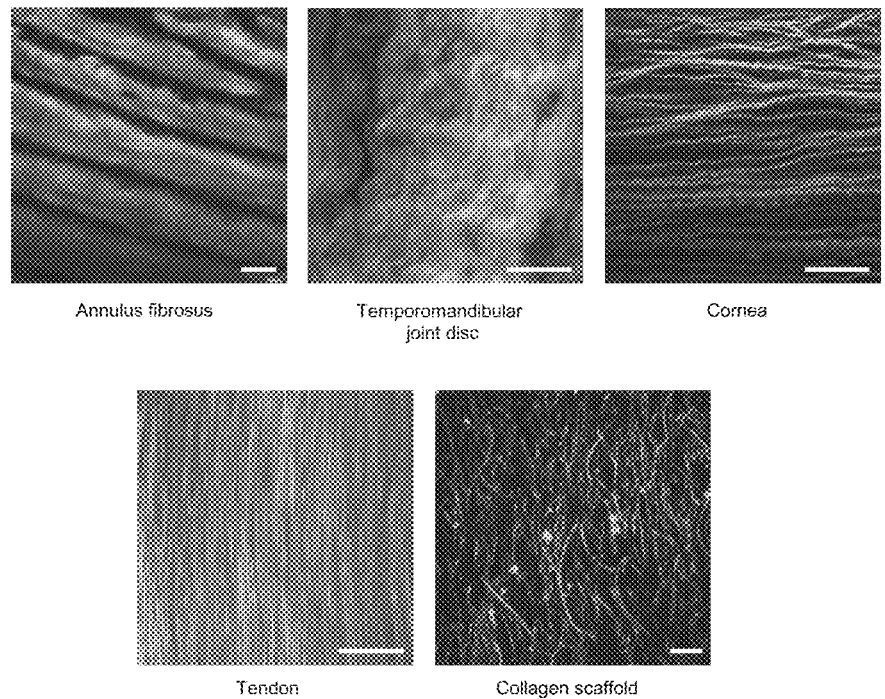
FIG. 1A illustrates example images of different tissues demonstrating structural features that can affect 3D diffusion in accordance with aspects of the present disclosure.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In general, the present disclosure is directed to systems and methods for non-invasive measurement of 3D molecular diffusion tensors that can be applied to determine diffusion tensors for a wide range of biological molecules and probes. The complexity of biological systems has demonstrated challenges for non-invasive assessment. Multicellular biological systems (e.g., mammals) are composed of cellular populations supported on extracellular scaffolds or matrices (e.g., collagen, intervertebral discs, etc.) that together form a tissue. Further, in some tissues, vascularization can be minimal; thus, molecular transport is largely controlled by diffusion processes in the extracellular scaffold. Current measurement techniques have often relied on ex situ tissue samples that have been extracted from the original source tissue. However, these techniques have led to conflicting results, and damage to the tissue samples due to extraction from the source tissue is demonstrated herein as one possible factor. Aspects of the present disclosure include the non-invasive measurement of molecular diffusion in various tissue samples. Additionally, diffusion characterization can be extended to a wide range of molecules including biomolecules (e.g., DNA, proteins, and hormones) and probes (e.g., dyes) due to the flexibility of fluorescence-based imaging and detection.

As an example for illustration, cellular migration in acellular tissue is an important aspect for the use and design of artificial tissue. Cellular migration is known to depend on extracellular signals, such as chemical signals, that may occur from diffusion due to in vitro growth conditions. Thus, understanding diffusion properties in in vitro systems may improve tissue colonization and subsequent efficacy. Aspects of the present disclosure can be used to measure diffusion in synthetic tissue scaffolds, as well as biological systems, to characterize the 3D diffusion properties and allow for effective comparison for diffusion of biological molecules, chemical analogs of biological molecules, and/or probes. These measurements can be used to alter the design of acellular tissue scaffolds by adjusting the composition and/or the 3D properties (e.g., alignment, crosslinking, density) of the acellular tissue scaffolds to achieve specific diffusion properties.

One implementation according to the present disclosure includes a data acquisition system for performing 3D imaging of a material. The data acquisition system can include a 3D two-photon scanned light sheet microscope which includes a light path for irradiating a 3D volume of a material with radiation at a certain wavelength (e.g., using a laser). Based on the type of radiation and the material, an emission signal (e.g., fluorescence) having an emission wavelength may be produced by an excitable molecule in the material. The emission wavelength can be detected using a sensor or other camera to capture the data for the emission wavelength over the 3D volume. For example, various proteins and probes have been developed that fluoresce upon excitation at a certain wavelength. Example implementations can include such excitable molecules to monitor diffusion processes according to aspects of the present disclosure. In general, an excitable molecule can include a molecule that, upon exposure to irradiation at a certain wavelength, emits a signal (e.g., fluorescence, autofluorescence, phosphorescence, etc.) at an emission wavelength that can be detected by a sensor.

The light sheet microscope can also include a 3D two-photon bleaching volume generator. The 3D two-photon bleaching volume generator can emit radiation along a second light path to bleach a portion of the 3D volume. As used herein, bleach or bleaching should be understood as a photochemical alteration of one or more chemicals present in the 3D volume that are capable of producing the emission signal. Upon bleaching, the one or more chemicals are altered to permanently reduce or lose the ability to produce the emission signal. Thus, the 3D two-photon bleaching volume generator can generate a bleached 3D volume (e.g., the portion of the 3D volume) that can have a controllable size and shape within the 3D volume. Since the 3D volume can include a plurality of excitable molecules, the emission wavelength emitted by excitable molecules can be detected by the sensor over all or a portion of the 3D volume. After producing a bleached 3D volume, the sensor can detect the signal over the entire 3D volume, and initially, the bleached 3D volume should display little or no signal (e.g., as would be detected by the data acquisition system). Due to diffusion processes, the bleached molecules will begin to mix with the unbleached molecules leading to recovery of the emission signal in the portion of the 3D volume.

Aspects of the data acquisition system can include a light path design. The light path design can include various configurations for irradiation of the 3D volume, bleaching of the portion of the 3D volume, and detection of the emission wavelength. For example, some implementations may include a single laser that can be split to produce a first beam at an illumination wavelength and a second beam at a bleaching wavelength. Alternatively, some implementations may include one or more lasers (e.g., two lasers) for generating the first beam and the second beam. Both the first beam and the second beam can be directed to reach the material using mirrors, lenses, and other implements for adjusting the pathway of the beams from source (e.g., an origin of the beams such as the splitter) to the material. Each of the beams may also be directed to interact with components to adjust the beam size and/or dimensionality. For example, various high-speed beam scanning systems can be used, and the first beam may be directed to interact with a scanning system such as a microoptoelectromechanical system (MEMS) mirror to irradiate the 3D volume (e.g., by scanning a 2D light sheet over an orthogonal axis). As another example, the second beam may be directed to interact with a galvanometer system (GS) to bleach a portion of the 3D volume (e.g., by bleaching a center region of the 2D light sheet). To adjust the portion of the 3D volume bleached by the second beam, the light path design can include elements (e.g., a piezo stage) for adjusting the position of an objective or adjusting the position of the focal plane of the objective; in this case, the objective does not have to move. For example, electrically, a Focus-Tunable Lens or Tunable Acoustic Index Gradient (TAG) Lens can be used to implement this path. In this manner, the portion of the 3D volume bleached by the second beam can be adjusted in coordination with the 2D light sheet along an orthogonal axis.

According to the present disclosure, one aspect of some data acquisition systems can include an imaging unit for structural imaging, morphological imaging, straining imaging, etc., as well as combinations thereof. For instance, a data acquisition system can include a nonlinear optical imaging unit (e.g., a SHG, THG, autofluorescence, routine fluorescence, or scattering-based imaging such as coherent anti-stokes Raman scattering and the like). The imaging system can include a source (e.g., one or more lasers) for generating an excitation event (e.g., two-photon excitation) and a detector (e.g., photomultiplier tube) for sensing and/or recording the signal. In this manner, characterization of a material and molecular diffusion in the material can be accomplished using the same system.

For implementations of the present disclosure, the light path design can include elements for independently controlling the type of irradiation interacting with the material. For instance, one or more shutters may be included after the splitter that can open or close to allow or prevent transmission of the first beam and/or the second beam to downstream components of the light path, including the material. In this manner, the separate optical paths for illumination and bleaching can allow for fast switching between imaging procedures, such as imaging prior to bleaching (e.g., pre-bleaching), during bleaching, and imaging after bleaching (e.g., post-bleaching). Additionally, control systems can be included to synchronize moving of the light sheet with the object rather than translating the sample to produce faster and more stable (e.g., lower noise) image acquisition over the 3D volume.

To allow for this synchronization, some example implementations may utilize the same objective for focusing the second beam providing a bleaching irradiation and for receiving emitted radiation from the 3D volume. For instance, a light path design can control irradiation, bleaching, and/or detection along one or more of three orthogonal directions (e.g., x, y, and z). As an example for illustration, a first beam can provide an excitation wavelength that can be projected into a 2D illumination plane (e.g., the x-y plane) using a MEMS mirror. A second beam can provide a bleaching wavelength that can be projected at a portion of the 2D illumination plane. Emission from the 2D illumination plane can be detected before, during, and after bleaching using a detection objective in communication with a sensor such that the emission wavelength from the material is received by the sensor to generate data descriptive of the emission intensity for the 2D illumination plane. As the 2D illumination plane is translated along the orthogonal direction (e.g., the z direction), the detection objective can be translated to maintain focus on the 2D illumination plane to capture a series of 2D emission intensities that can be combined to reconstruct emission signals for the entire 3D volume. Since the emission signal is correlated to concentration, recovery of emission signal from the bleached volume over time can be used to determine rates of change in concentration that result from diffusion of unbleached molecules into the bleached volume.

In certain implementations, the data acquisition system can be in communication with a computing system that includes instructions for controlling elements of the data acquisition system. For example, a computing system according to the present disclosure can include one or more processors and memory, such as non-transitory computer readable media that, when executed by the one or more processors, causes the computing system to perform operations. Due to the short timescale of diffusion processes, computing systems provide useful advantages for quickly adjusting elements of the data acquisition system. Additionally, determining the diffusion tensor from image data can require storage of a plurality of image frames that together include data descriptive of emitted radiation in the volume. Further, the data descriptive of emitted radiation in the volume may be acquired multiple times over a time period. As should be understood, diffusion is a type of movement, and diffusivity attempts to capture the rate of diffusion (e.g., movement over time). Thus, one aspect of determining the diffusion tensor can include storing data descriptive of the emitted radiation in the volume at multiple time points over a time period. From this data, the emitted radiation can be correlated to molecular concentrations at each time point and the variations in concentrations over time can be used to extract the diffusion tensor.

Each of the transformations described (e.g., correlating emitted radiation to concentration and using the variations in concentrations over time to determine the diffusion tensor) may also benefit from being performed by the computing system. Computing systems can perform calculations for solving systems of partial differential equations that would be burdensome to perform otherwise. Thus, some implementations of the present disclosure can include computer implemented methods for determining the 3D diffusion tensor.

One aspect of data acquisition can include recording one or more pre-bleaching datasets and one or more post-bleaching datasets. In general, the sensor captures a 2D image of emitted irradiation from the material at a certain coordinate in a third, orthogonal dimension. An example pre-bleaching dataset and/or an example post bleaching dataset can include data descriptive of one or more image frames that include an array of pixels representing points in two dimensions (e.g., x, y coordinates) at an acquisition time (t). For some implementations, the pre-bleaching dataset can include a plurality of image frames that together comprise the 3D volume. In some implementations, the post-bleaching dataset can include a plurality of image frames that together comprise the 3D volume. To account for artifacts from continuous data acquisition, possible nonuniform distribution of excitable molecules in the material, uneven illumination, and/or stripe artifacts caused by mismatching of the refractive indices along the light sheet propagation direction, the pre-bleaching datasets can be used to normalize the post-bleaching datasets.

Ideally, the image frames acquired prior to bleaching should display uniform emission; however, to account for artifacts, some implementations may include methods for normalizing the image frame data. As an example, the intensities for each pixel in the pre-bleaching image frames can be used to modify the post-bleaching image frames (e.g., by dividing the pixel intensities for each pixel in the post-bleaching image frame at a given time) by the corresponding pixel intensities for each pixel in the pre-bleaching image frame taken at a corresponding time. For implementations of the present disclosure, the corresponding time can mean acquiring the pre-bleaching image frames for the 3D volume at a first time initiating a bleaching event, and subsequently acquiring the post-bleaching image frames for the 3D volume at a second time. The pixel intensities for the 3D volume at a time prior to the bleaching event and a time after the bleaching event are considered as taken at a corresponding time when the time prior to the bleaching event and the time after the bleaching event differ by less than the effective time scale of diffusion. As one example, the effective time scale of diffusion can be determined based on the effective area of the 3D volume (e.g., the cross-sectional area of the shortest dimension, the average cross-sectional area, etc.) divided by the diffusivity of the excitable molecule. This produces a timescale for diffusion that can be used for normalization.

As used herein, a bleaching event can constitute focusing irradiation on the portion of the 3D volume. The irradiation can be derived from a light source (e.g., a laser) that can be the same or a different light source from the light source generating emission from the excitable molecule(s). To generate a 3D bleached volume, implementations can be configured to perform 3D point-scanning at the center of the 3D volume.

For some example data acquisition systems, the system can be configured to acquire images at a rate of between about 1 volume/second and about 10 volumes/second, such as from about 4 volumes/second to about 9 volumes/second, or from about 5 volumes/second to about 8 volumes/second. However, it should be understood that slower or faster rates are contemplated. For instance, in some embodiments, it may be preferred to acquire images at a rate of about 1 volume/second or slower, for instance, when considering a slow diffusion embodiment. While individual image frames may be acquired at a faster frequency, the total time to acquire the series of image frames for constructing the 3D volume can be performed at a rate of about 7 volumes/ second (vol/s) or greater in some embodiments, such as about 7 vol/s, 7.5 vol/s, 8 vol/s, 8.5 vol/s, 9 vol/s, 9.5 vol/s, or 10 vol/s.

Aspects of the data acquisition system can also be configured to generate a size for the volume. For instance, some example systems can scan a volume of from about 200,000 $\mu m^3$ to about 800,000 $\mu m^3$, such from about 300,000 $\mu m^3$ to about 700,000 $\mu m^3$, or from about 350,000 $\mu m^3$ to about 600,000 $\mu m^3$ (e.g., about 200,000 $\mu m^3$, about 250,000 $\mu m^3$, about 300,000 $\mu m^3$, about 350,000 $\mu m^3$, about 400,000 $\mu m^3$, about 450,000 $\mu m^3$, about 460,000 $\mu m^3$, about 470,000 $\mu m^3$, about 500,000 $\mu m^3$, or about 600,000 $\mu m^3$). However, larger or smaller volumes are encompassed herein as well. The size of the volume may depend on the type of material and/or the diffusing molecule. Smaller molecules may exhibit higher diffusion rates that can be better captured using a larger volume. While larger molecules generally exhibit lower diffusion rates, the material properties may lead to anisotropic diffusion that could demonstrate faster diffusion in certain directions that would better be captured using a large volume. In general, diffusion for various molecules in biological systems can be detected over micrometer scales using example data acquisition systems herein.

One example implementation of the present disclosure includes a computer implemented method for determining the 3D diffusion tensor for a compound present in a material. Aspects of the method can include operations such as acquiring a plurality of datasets that together include data descriptive of an emission wavelength for the compound present in the material for a 3D volume of the material. The method can also include performing a 3D spatial Fourier analysis on the plurality of datasets, e.g., a 3D spatial Fourier transform in the frequency domain. One aspect of example methods is that the intensity values for the emission wavelengths (e.g., pixel intensity values) can be directly used without conversion to concentrations. Without ascribing to any specific theory, it is posited that the Fourier transform of the image intensity values for the 3D volume obey the same exponential decay as the compound concentration profile in the frequency domain generated by the Fourier transform. Thus, determining the 3D diffusion tensor can be based at least in part on the spatial Fourier analysis for a plurality of 3D volumes taken over a time span. Additionally, example implementations can solve these equations without correlating the intensity values to concentrations. As one example, determining the 3D diffusion tensor can include solving $$\frac{\hat{C}(u, v, w, t)}{\hat{C}(u, v, w, 0)} = \exp[-4\pi^2(u^2 + v^2 + w^2)D(u, v, w)t],$$

where $D(u, v, w) = \frac{u^2 D_{xx} + v^2 D_{yy} + w^2 D_{zz} + 2uvD_{xy} + 2uwD_{xz} + 2vwD_{yz}}{u^2 + v^2 + w^2}$, and where $\hat{C}(u, v, w, t) = \int_{-\infty}^{\infty}\int_{-\infty}^{\infty}\int_{-\infty}^{\infty} C(x, y, z, t)e^{-2\pi i(ux+vy+wz)}dxdydz$.

Certain example computer-implemented methods can also include instructions for acquiring data, such as communicating operations to a data acquisition system. For example, methods can communicate operations for scanning a laser along two orthogonal axes to crease a 3D illuminated volume. Additional instructions can include transmitting a bleaching laser to a region (e.g., the center) of the 3D illuminated volume, detecting a pre-bleaching fluorescence signal for the 3D illuminated volume over a first time period occurring before transmitting the bleaching laser to the region, and detecting a post-bleaching fluorescence signal for the 3D illuminated volume over a second time period occurring after transmitting the bleaching laser to the region.

Figure 1B:
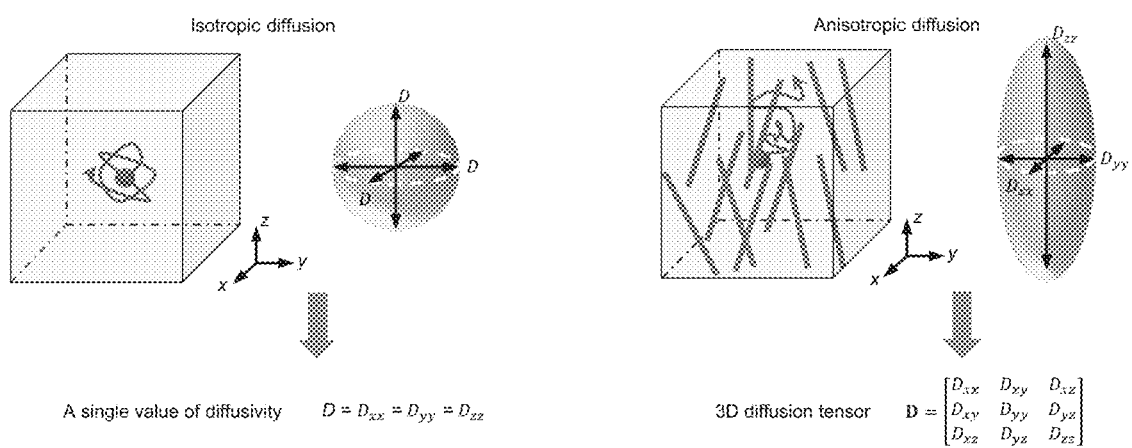
FIG. 1B illustrates images to visualize example isotopic diffusion processes (left) and example anisotropic diffusion processes (right) that can be determined according to implementations of the present disclosure.
Figure 1C:
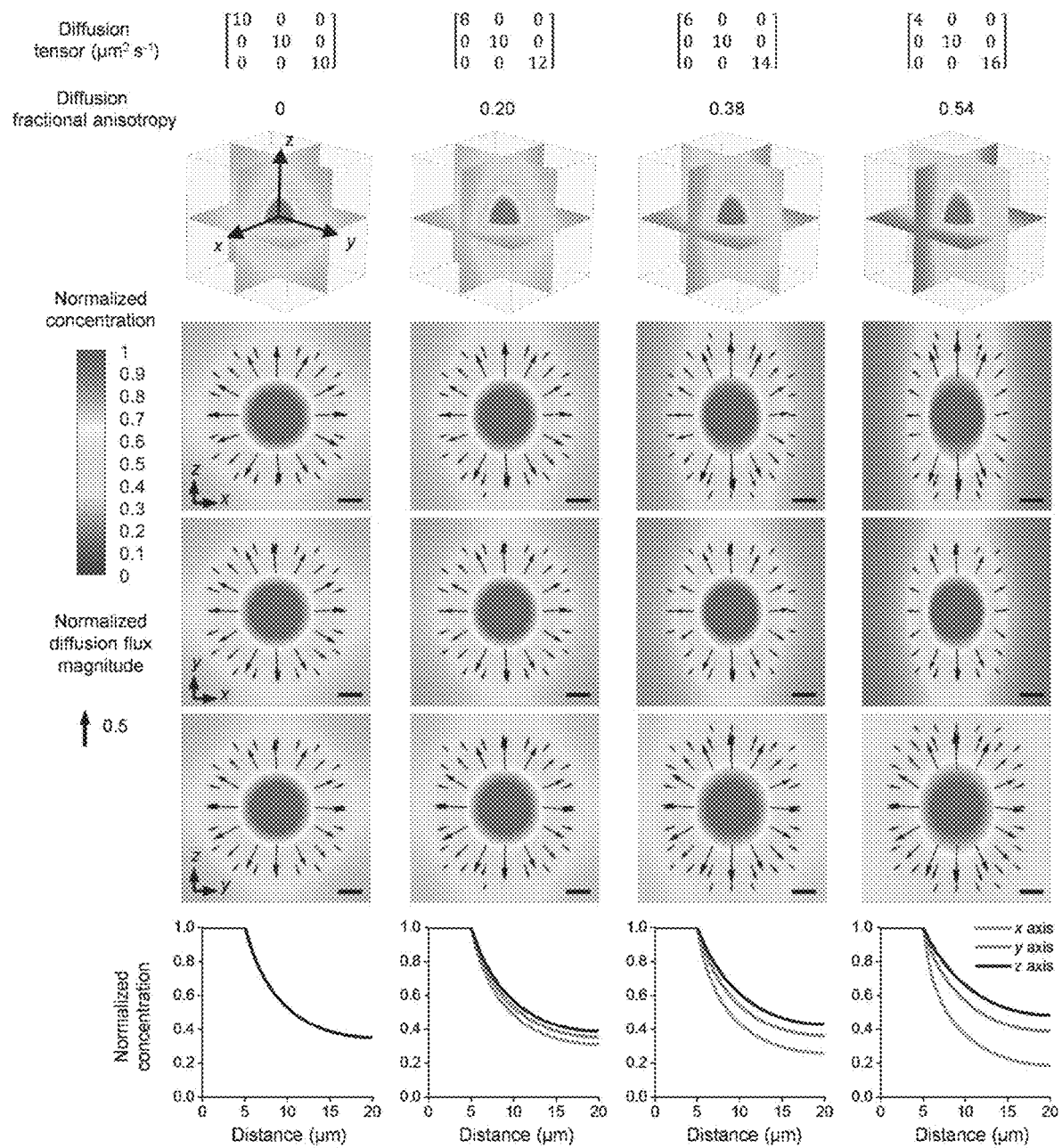
FIG. 1C illustrates example parameters for example 3D diffusion tensors and provides visual representations in the form of graphs to demonstrate diffusion anisotropy according to aspects of the present disclosure.

Aspects of the present disclosure may be better understood through examples and data illustrated in the Figures. FIGS. 1A-1C illustrate data demonstrating that a 3D diffusion tensor can provide additional benefits for characterizing anisotropic molecular diffusion in biological systems. For instance, FIG. 1A illustrates images of anisotropic matrix structures, captured using SHG imaging, of different biological tissues including rat annulus fibrosus, porcine temporomandibular joint disc, cornea, tendon, and collagen scaffold (respectively, from left to right). For each image, the white bar at the bottom indicates 50 $\mu$m. FIG. 1B illustrates at the left a model of 3D isotropic diffusion (e.g., identical diffusivities in all directions) which can be characterized by a single diffusivity value. The model of 3D isotropic diffusion on the left of FIG. 1B is contrasted to a model of 3D anisotropic diffusion illustrated on the left of FIG. 1B, which can show direction-dependent diffusivities that can be described by a 3D diffusion tensor (e.g., a 3×3 matrix of diffusivities). It should be understood that the 3D diffusion tensor can indicate the degree of anisotropy (e.g., lower/no anisotropy or greater anisotropy) based on the diagonal components of the 3D diffusion tensor (e.g., Dxx, Dyy, and Dzz). FIG. 1C illustrates results from computational simulations of molecular diffusion out from a source center in a 3D domain. The results display that molecular dynamics and concentration distributions are regulated by 3D molecular diffusion. 3D anisotropic diffusion generates significantly different molecular dynamics and molecular distributions compared to isotropic diffusion. The simulation compared four 3D diffusion tensors, shown at the top, each having an identical average diffusivity (10 $\mu m^2$/s), and calculated fractional anisotropies (see Methods and Materials section of the Examples, below). The panels beneath the calculated fractional anisotropy values depict 3D normalized concentration distributions and beneath those panels, additional panels depicting 2D normalized concentration distributions with diffusion flux vectors (black arrows) in the three orthogonal planes as shown in the 3D plot at a time of 28 seconds. The concentrations were normalized to the value at the source center, while the diffusion fluxes were normalized to the maximum diffusion flux magnitude among all models. Scale bar, 5 $\mu$m. The bottom panels of FIG. 1C depict normalized concentration plots along X axis, Y axis, and Z axis as indicated from the source center to the edge of the 3D domain at a time of 28 seconds. Under 3D anisotropic diffusion, concentration profiles vary among the axes, and the extent of this difference becomes greater as diffusion anisotropy increases moving to the right across the figure.

Figure 2A:
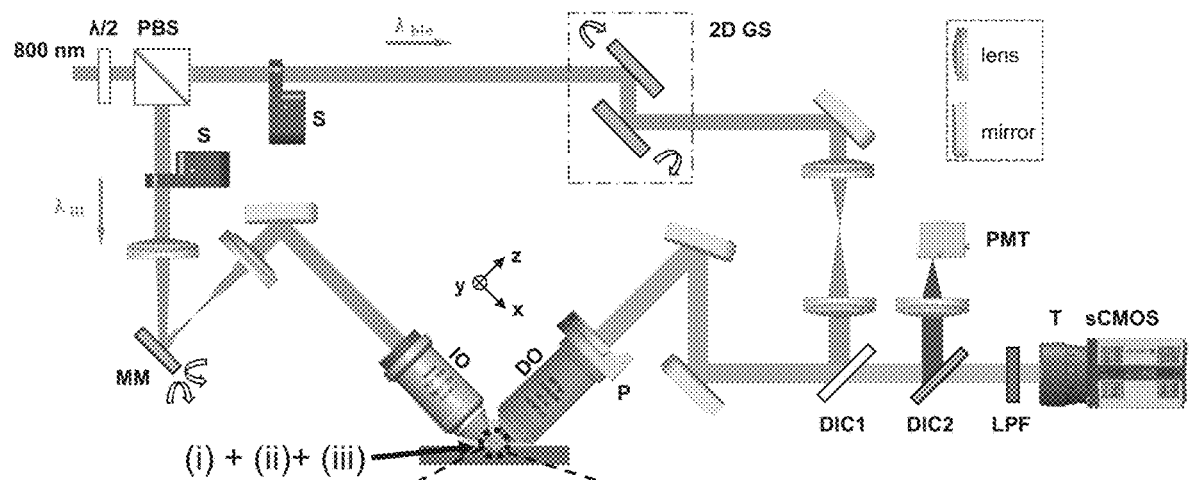
FIG. 2A illustrates an example system diagram for an example data acquisition system according to example implementations of the present disclosure.

FIGS. 2A-2F illustrate aspects of the development and validation of disclosed systems and methods for noninvasive 3D diffusion tensor measurement. As depicted in FIG. 2A, an example schematic of a system can include a light sheet imaging approach and, in this embodiment, can be referred to as light sheet imaging-based Fourier transform fluorescence recovery after photobleaching, referred to herein as LiFT-FRAP. As depicted in FIG. 2A, a LiFT-FRAP setup can include a splitter for directing half the laser wavelength ($\lambda$/2) along an illumination path ($\lambda_{ill}$) and the remainder along a bleaching path ($\Delta_{ble}$). Along the illumination path and bleaching paths, additional components such as one or more lenses and/or mirrors may be used to direct the radiation to objectives for irradiating a material. Abbreviations and terms depicted in the Figures include the following: $\lambda$/2, half waveplate; PBS, polarizing beam splitter; S, shutter; 2D GS, 2D galvanometer system; MM, MEMS mirror; 10, illumination objective; DO, detection objective; P, piezo stage; DIC, dichroic mirror; LPF, low pass filter; T, tube lens; $\lambda_{ill}$, illumination path carrying illumination signal; $\lambda_{det}$, detected emission fluorescence; $\lambda_{ble}$, bleaching path carrying bleaching signal; sCMOS, complementary metal oxide semiconductor sensor.

Figure 2B:
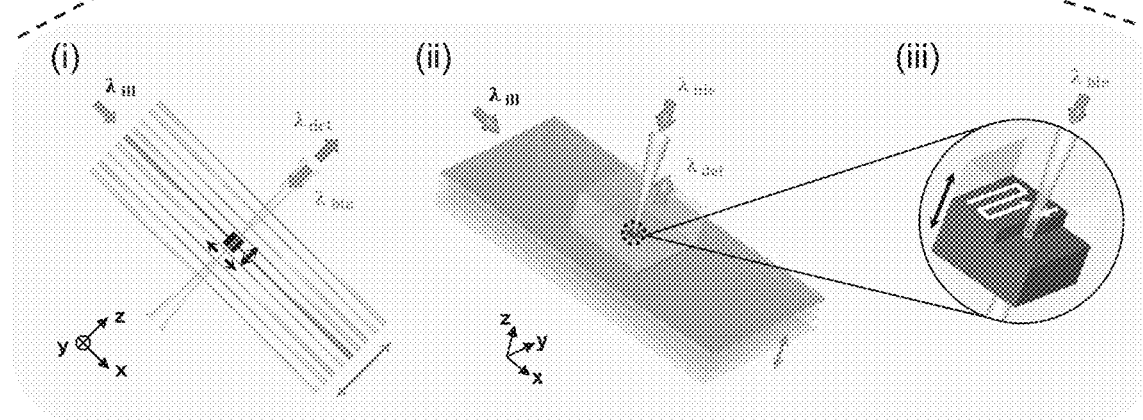
FIG. 2B illustrates example aspects of FIG. 2A according to example implementations of the present disclosure.

As depicted in FIG. 2B, implementations can perform 3D volumetric scanning by generating a light sheet to illuminate a thin slice of the sample and scanning a 3D volume [FIG. 2B at (i)]. A DO can collect the emitted fluorescence [FIG. 2B at (ii)]. Further, a high-intensity bleaching laser can create a bleaching volume by performing 3D point-scanning at the center of the 3D illuminated volume [FIG. 2B at (iii)].

Figure 2C:
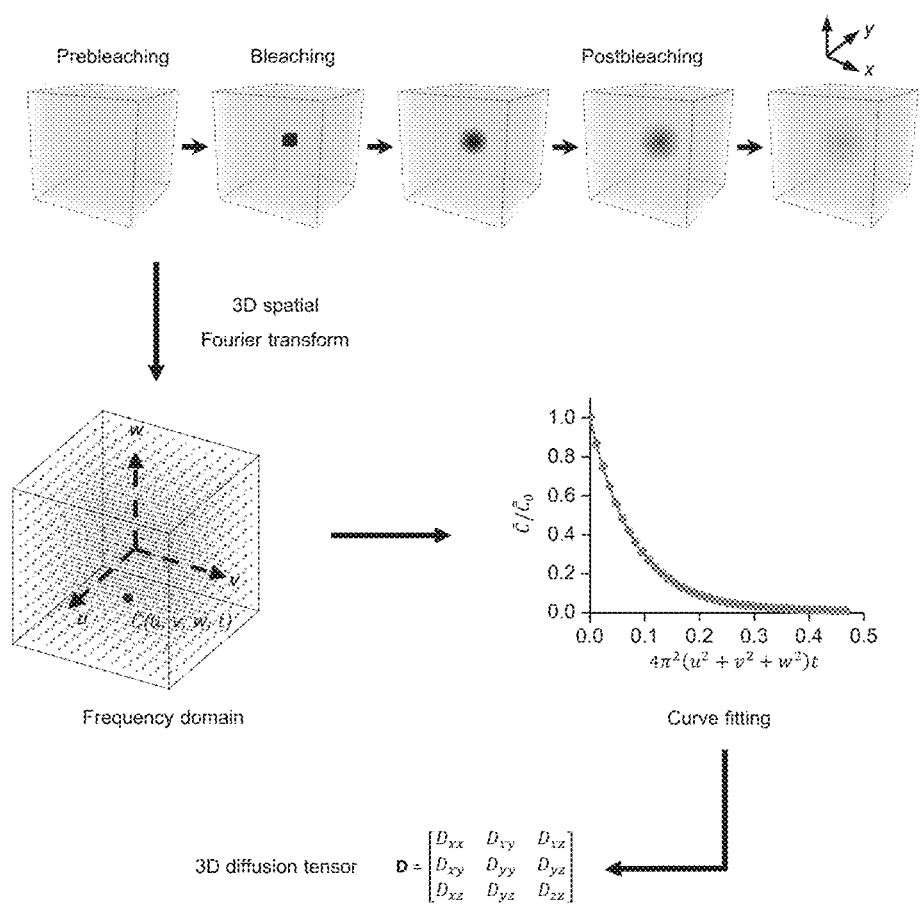
FIG. 2C illustrates a schematic time lapse of 3D data acquired during pre-bleaching, bleaching, and post-bleaching and subsequent data analysis steps including 3D spatial Fourier transform in the frequency domain and curve fitting to obtain a 3D diffusion tensor.

In FIG. 2C, an example series of image frames collected by the detection objective is shown. As depicted, for the example method, one or more pre-bleaching images can be collected for a sample prior to applying bleaching radiation as well as during bleaching, if desired. After bleaching radiation, one or more post-bleaching images can be collected, and in some instances, immediately after bleaching. For instance, a time series of 3D image data that can record the 3D fluorescence recovery process can be processed and then converted to the frequency domain through a 3D spatial Fourier transformation as indicated in FIG. 2C. It is generally expected that the normalized solute concentration in the frequency domain eye $\tilde{C}/\tilde{C}_0$ (gray circles in FIG. 2C) will gradually decrease with the 3D fluorescence recovery (u, v, w in the frequency domain image are the spatial frequency coordinate and the unit of u, v, w can be, for instance, $\mu m^{-1}$). Upon curve fitting, a diffusivity value can be determined and then each component of the 3D diffusion tensor can be calculated, as indicated in FIG. 2C.

Figure 2D:
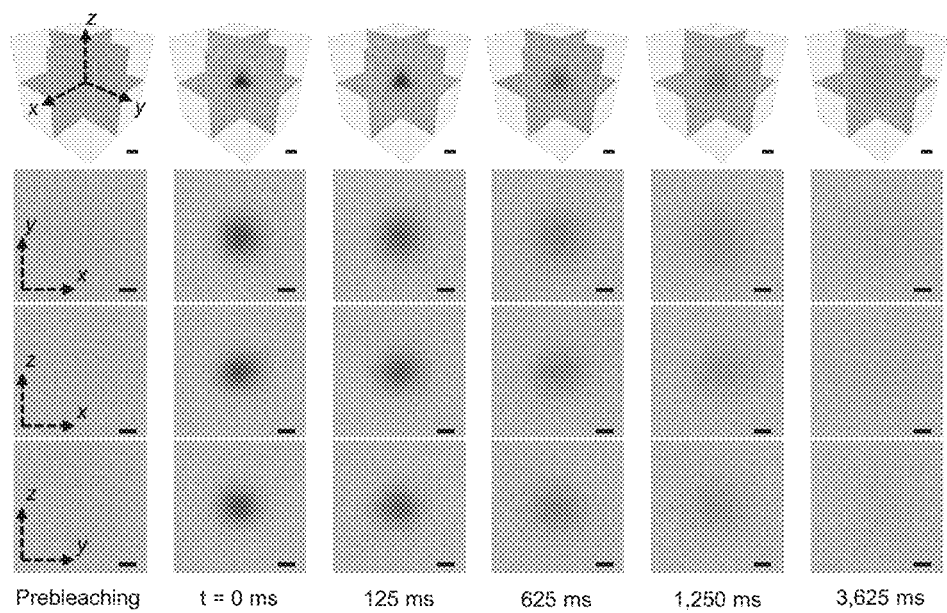
FIG. 2D illustrates an example time lapse for 3D data and 2D orthogonal image slices of the 3D data at different time points for diffusion of fluorescein in glycerol. The scale bar is 10 μm.
Figure 2E:
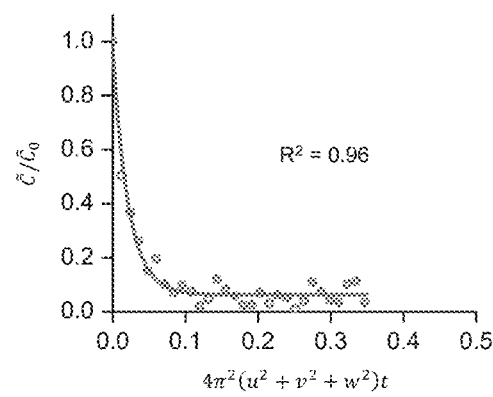
FIG. 2E presents diffusivity data obtained by analysis of the data of FIG. 2D according to disclosed methods.

In FIG. 2D, experimental data for a time series of LiFT-FRAP 3D images obtained for sodium fluorescein in 55% glycerol solution is shown. FIG. 2E graphically presents the curved fitting results of the data collection indicated in FIG. 2D. The y-axis of FIG. 2E is the normalized solute concentration in the frequency domain (gray circles). u, v, w are the spatial frequency coordinate. The fitted curve is shown overlaying the data points.

Figure 2F:
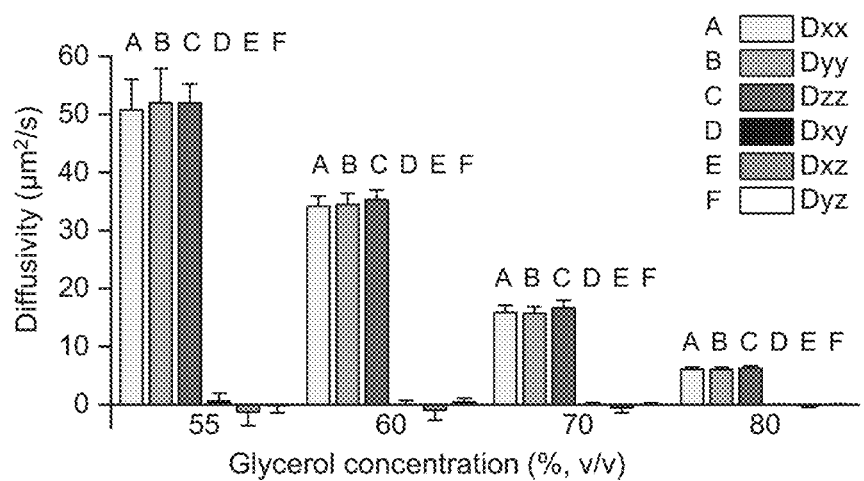
FIG. 2F illustrates a graph displaying example results for diffusivity measurements for components of a 3D diffusion tensor for fluorescein taken at different glycerol concentrations according to example aspects of the present disclosure.

In FIG. 2F, 3D diffusion tensor results of sodium fluorescein in different glycerol solutions are shown.

Figure 2G:
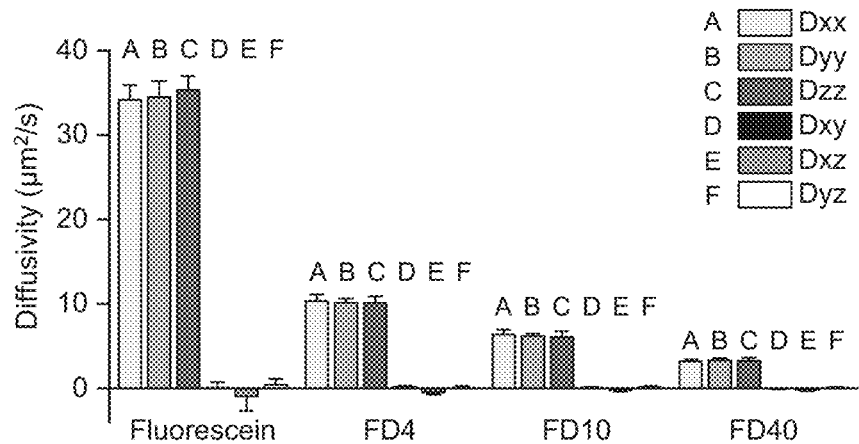
FIG. 2G illustrates a graph displaying example results for diffusivity measurements for components of a 3D diffusion tensor determined using fluorescein, 4 kilodalton fluorescein isothiocyanate-dextran (FD4), 10 kilodalton fluorescein isothiocyanate-dextran (FD10), or 40 kilodalton fluorescein isothiocyanate-dextran (FD40) according to example aspects of the present disclosure.

In FIG. 2G, 3D diffusion tensor results of sodium fluorescein and FD molecules in 60% glycerol solutions are shown.

Figure 2H:
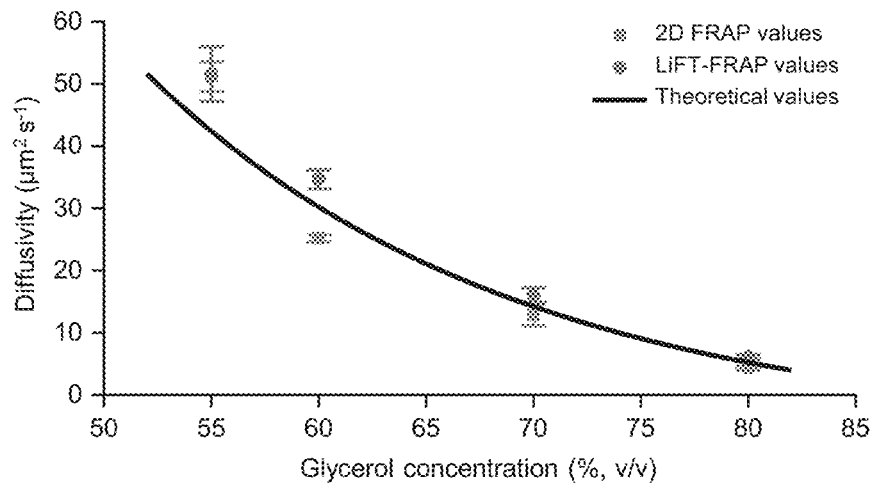
FIG. 2H illustrates a graph displaying example results for diffusivity of fluorescein at varying glycerol concentrations according to example aspects of the present disclosure and comparing theoretical values to those obtained via two dimensional fluorescence recovery after photobleaching (2D FRAP) and light sheet imaging-based Fourier transform fluorescence recovery after photobleaching (LiFT-FRAP).

In FIG. 2H, data is shown comparing FRAP results (n=12), LiFT-FRAP results (n=12), and theoretical results for different glycerol solutions.

Figure 2I:
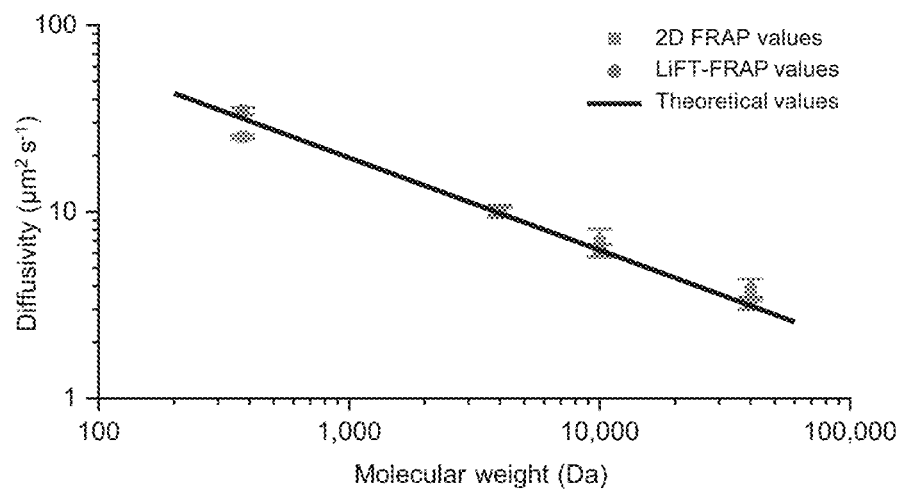
FIG. 2I illustrates a graph displaying example results for diffusivity of fluorescein at varying molecular weight according to example aspects of the present disclosure.

In FIG. 2I, data is shown depicting the average values of the diagonal components of 2D and 3D LiFT-FRAP diffusion tensor and comparing these values to theoretical values.

Figure 3A:
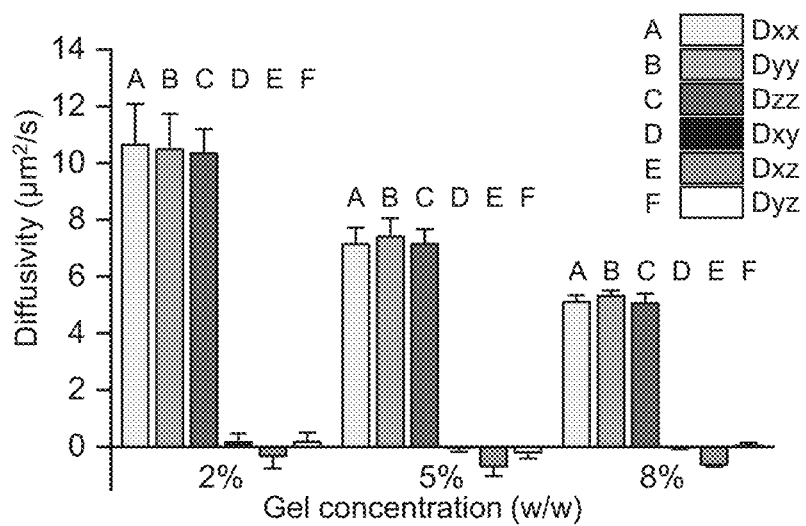
FIG. 3A illustrates a graph displaying example results for diffusivity measurements for components of a 3D diffusion tensor for 70 kilodalton fluorescein isothiocyanate-dextran (FD70) at different gel concentrations according to example aspects of the present disclosure.

FIG. 3A and FIGS. 3E-3H illustrate data and results demonstrating direction-dependent changes in 3D diffusion due to structural manipulations in tissue engineering scaffolds. For instance, FIG. 3A depicts 3D diffusion tensor results of FD70 in 2%, 5%, and 8% gelatin hydrogels (n=14 for 2%, n=10 for 5% and n=8 for 8%).

Figure 3B:
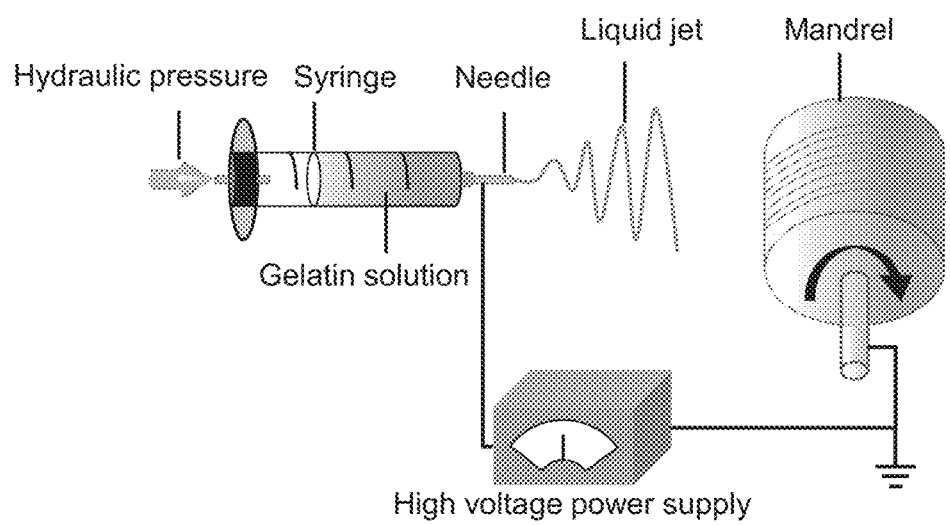
FIG. 3B illustrates an example diagram of an example system for producing artificial scaffolds according to example aspects of the present disclosure.

In FIG. 3B, an example electrospinning setup is depicted for fabricating fiber-based scaffolds. The mandrel can be rotated during electrospinning to produce fiber-aligned scaffolds and may be held stationary to produce random fiber scaffolds. An example of a fiber-aligned scaffold is shown in FIG. 3C, which depicts an SEM image taken of fiber produced while rotating a mandrel. An example of a random fiber scaffold is shown in FIG. 3D, which depicts an SEM image taken of fiber produce while the mandrel is stationary.

Figure 3E:
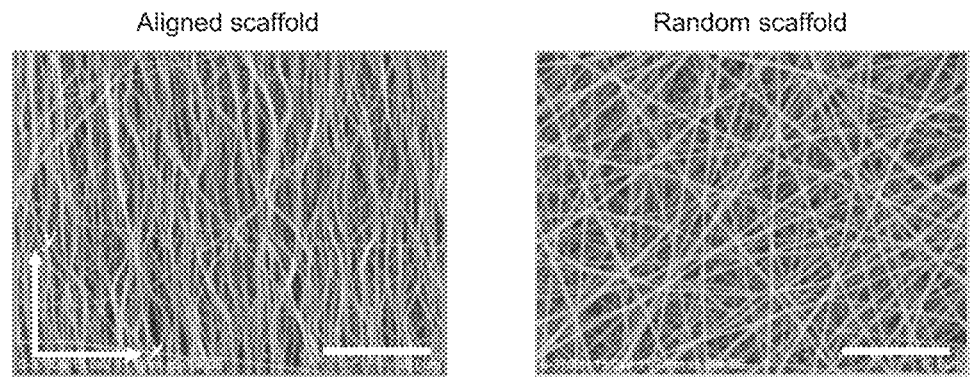
FIG. 3E illustrates example results for diffusivity measurements for components of the 3D diffusion tensor for FD10 and 20 kilodalton fluorescein isothiocyanate-dextran (FD20) according to example aspects of the present disclosure.
Figure 3E:
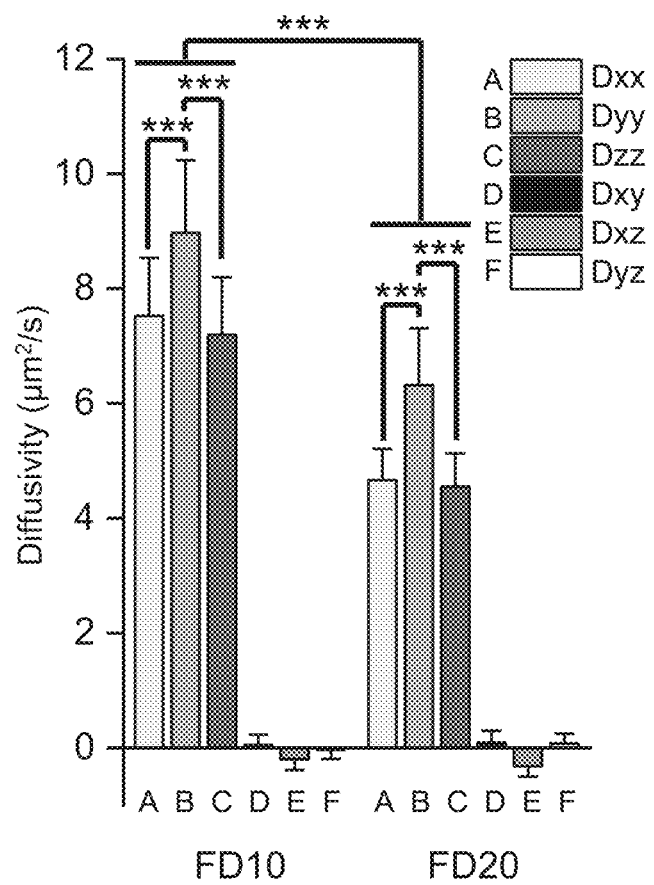

In FIG. 3E, 3D diffusion tensor results are depicted for FD10 and FD20 in fiber-aligned scaffolds (n=24 measurements from 8 scaffolds for FD10 and n=20 measurements from 7 scaffolds for FD20, 2-3 measurements at different locations on each sample). ***$P<0.001$, one-way and two-way ANOVA with Bonferroni post-hoc test.

Figure 3F:
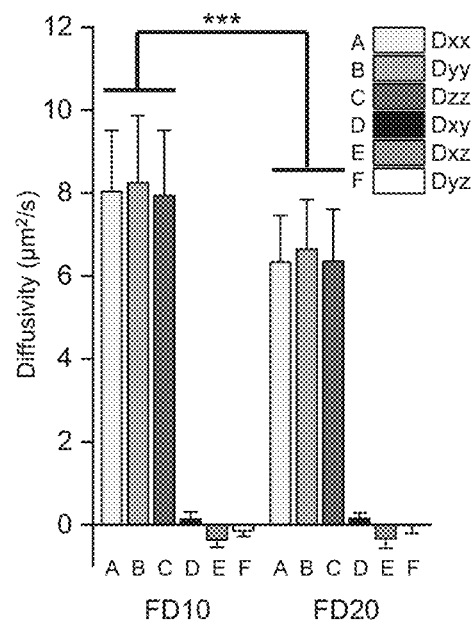
FIG. 3F illustrates further example results for diffusivity measurements for components of the 3D diffusion tensor for FD10 and FD20 according to example aspects of the present disclosure.

In FIG. 3F, 3D diffusion tensor results of FD10 and FD20 in random fiber scaffolds (n=17 measurements from 6 scaffolds for FD10 and n=15 measurements from 5 scaffolds for FD20, 2-3 measurements at different locations on each sample). ***$P<0.001$, two-way ANOVA with Bonferroni post-hoc test.

Figure 3G:
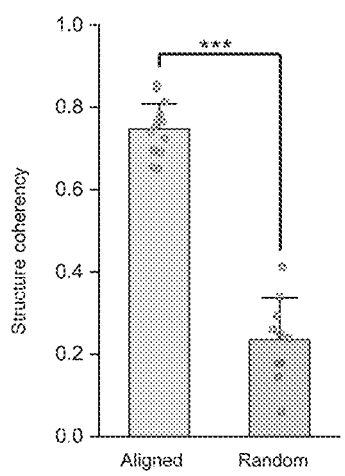
FIG. 3G illustrates a graph displaying the coherency coefficient determined using an example aligned artificial scaffold and an example random artificial scaffold according to example aspects of the present disclosure.

In FIG. 3G, coherency coefficient of fiber alignment in aligned and random scaffolds based on their SEM images (n=16 for aligned scaffolds and n=10 for random scaffolds). ***$P<0.001$, two-sided t-test.

Figure 3H:
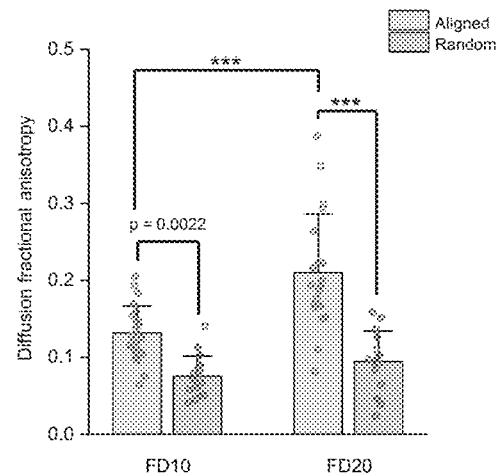
FIG. 3H illustrates a graph displaying the fractional anisotropy determined using an example aligned artificial scaffold and an example random scaffold for FD10 and FD20 according to example aspects of the present disclosure.

In FIG. 3H, 3D diffusion fractional anisotropy calculated from 3D diffusion tensor results of FD molecules in fiber-aligned scaffolds (n=24 measurements from 8 scaffolds for FD10 and n=20 measurements from 7 scaffolds for FD20, 2-3 measurements at different locations on each sample) and random fiber scaffolds (n=17 measurements from 6 scaffolds for FD10 and n=15 measurements from 5 scaffolds for FD20, 2-3 measurements at different locations on each sample). ***$P<0.001$, one-way ANOVA with Bonferroni post-hoc test.

Figure 4A:
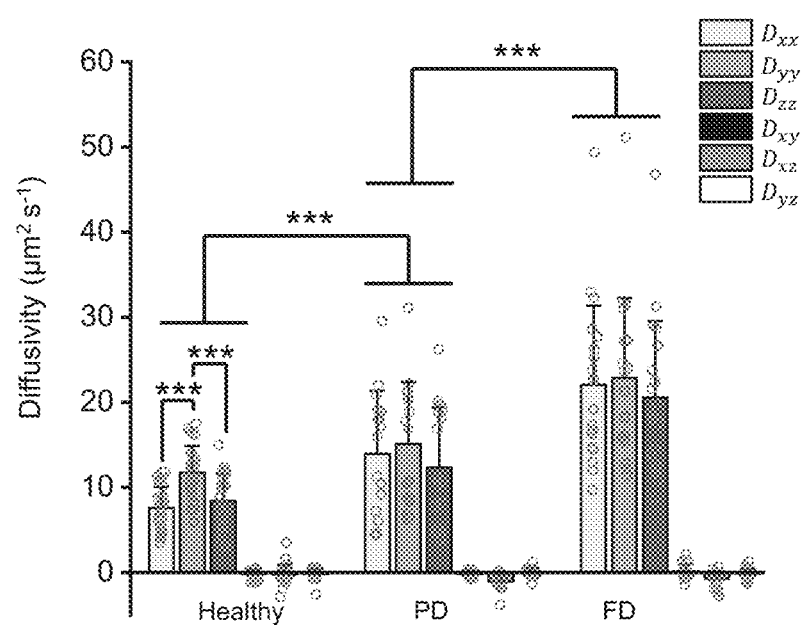
FIG. 4A illustrates a graph displaying example results for diffusivity measurements for components of a 3D diffusion tensor for fluorescein in healthy, partially denatured (PD), and fully denatured (FD) tissue groups according to example aspects of the present disclosure.
Figure 4B:
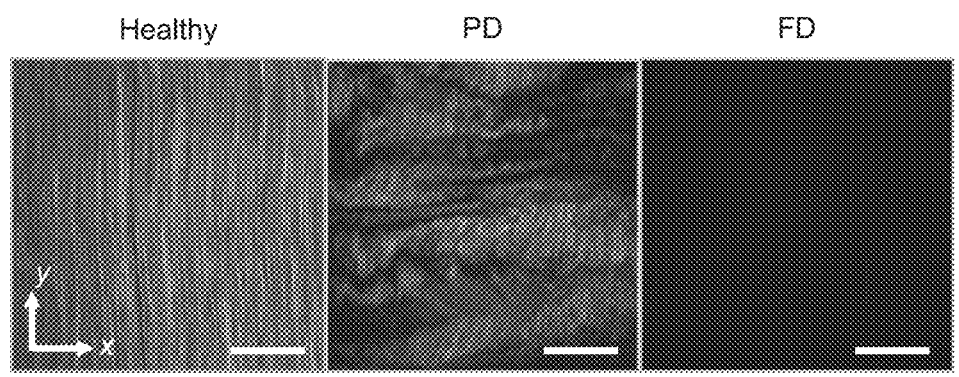
FIG. 4B illustrates example collagen fiber images of healthy, PD, and FD groups.

FIGS. 4A-4F provide data demonstrating direction-dependent changes in 3D diffusion induced by pathological changes in tissue structure and composition. For instance, FIG. 4A depicts 3D diffusion tensor results of sodium fluorescein in healthy, partially denatured (PD), and fully denatured (FD) tendons (n=27 measurements from 10 healthy tendons, n=17 measurements from 6 PD tendons and n=20 measurements from 9 FD tendons, 1-3 measurements at different locations on each sample). *$P<0.001$, one-way and two-way ANOVA with Bonferroni post-hoc test. Example effects of pathology changes are depicted in FIG. 4B**, which shows representative SHG images of healthy, PD, and FD tendons at a depth of 150 μm beneath the tissue surface.

Figure 4C:
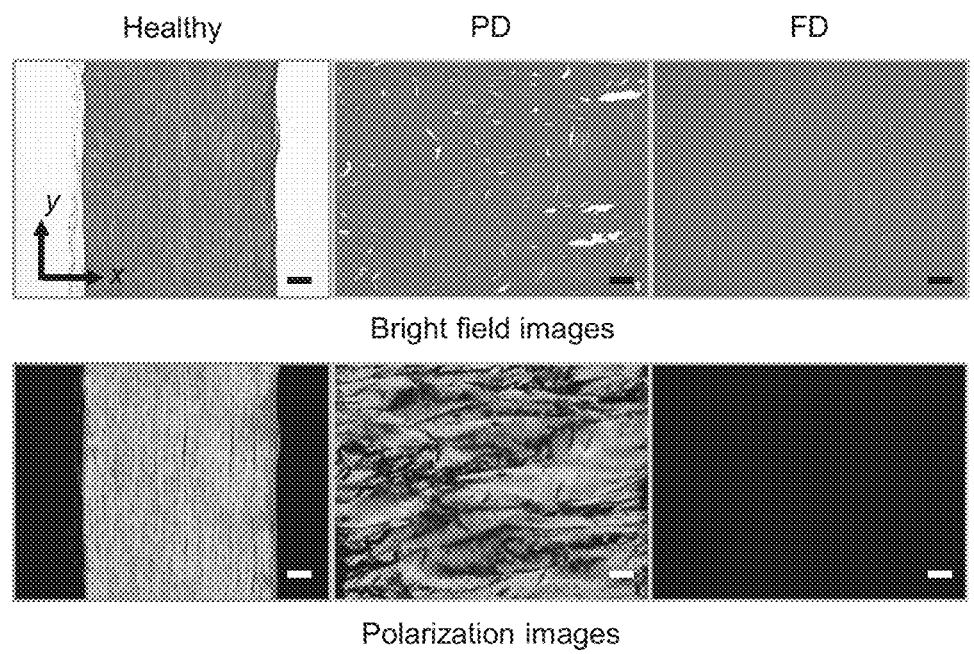
FIG. 4C illustrates example bright field images (top) and example polarization images (bottom) of the healthy, PD and FD tissue groups.

In FIG. 4C, representative bright field and polarization images are depicted for picrosirius red stained sections of healthy, PD, and FD tendons.

Figure 4D:
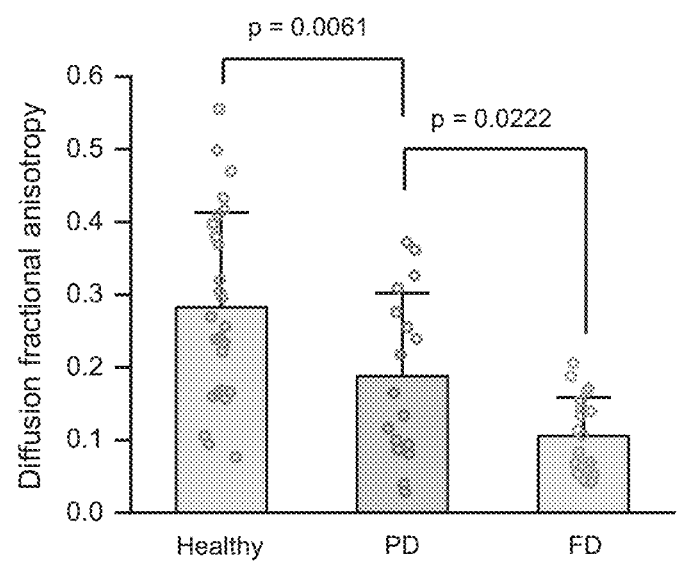
FIG. 4D illustrates a graph displaying example fractional anisotropy values measured for healthy, PD and FD tissue groups.

In FIG. 4D, a graph depicts 3D diffusion fractional anisotropy of sodium fluorescein diffusion in healthy, PD, and FD tendons (n=27 measurements from 10 healthy tendons, n=17 measurements from 6 PD tendons, and n=20 measurements from 9 FD tendons, 1-3 measurements at different locations on each sample). * $P<0.05$ and ** $P<0.001$, one-way ANOVA with Bonferroni post-hoc test.

Figure 4E:
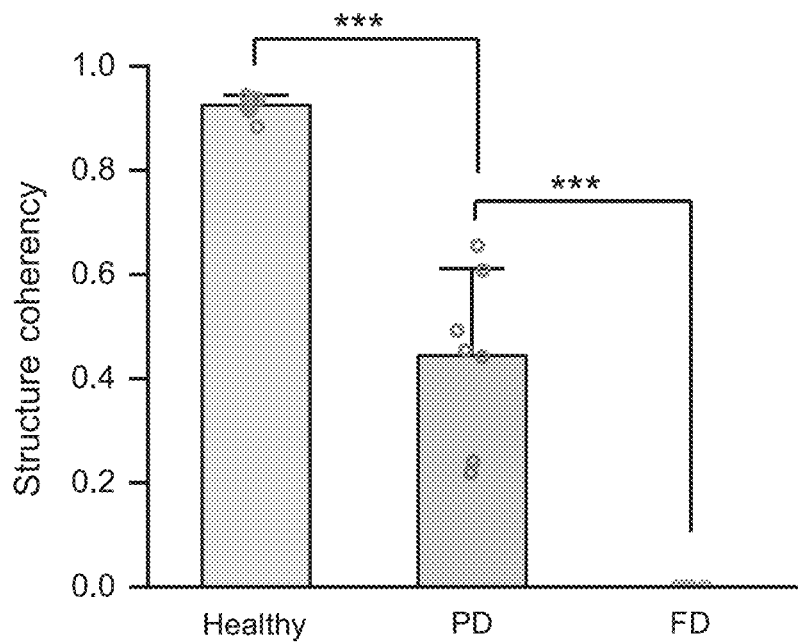
FIG. 4E illustrates a graph displaying example coherency coefficient values measured for healthy, PD and FD tissue groups.

In FIG. 4E, a graph depicts coherency coefficient of collagen fiber alignment in healthy, PD, and FD tendons based on their SHG images (n=9 for healthy tendons, n=7 for PD tendons, and n=8 for FD tendons). *** $P<0.001$, one-way ANOVA with Bonferroni post-hoc test.

Figure 4F:
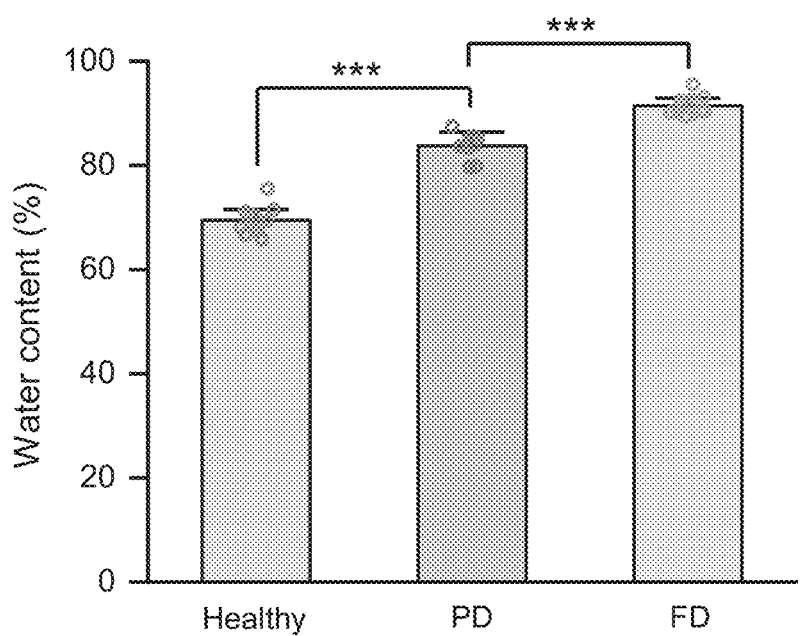
FIG. 4F illustrates a graph displaying example water content (%) values measured for healthy, PD and FD tissue groups.

In FIG. 4F, water content in healthy, PD, and FD tendons (n=18 for healthy tendons, n=9 for PD tendons, and n=17 for FD tendons). *** $P<0.001$, one-way ANOVA with Bonferroni post-hoc test.

Figure 5A:
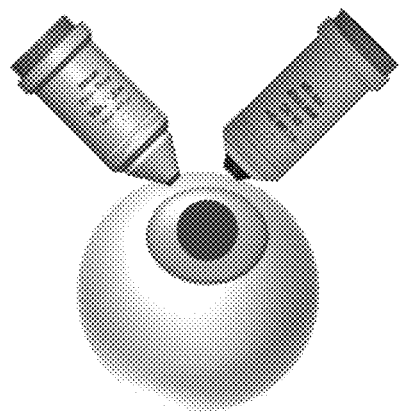
FIG. 5A illustrates a schematic approach for in situ diffusion measurement in the cornea of an eyeball according to aspects of the present disclosure.
Figure 5B:
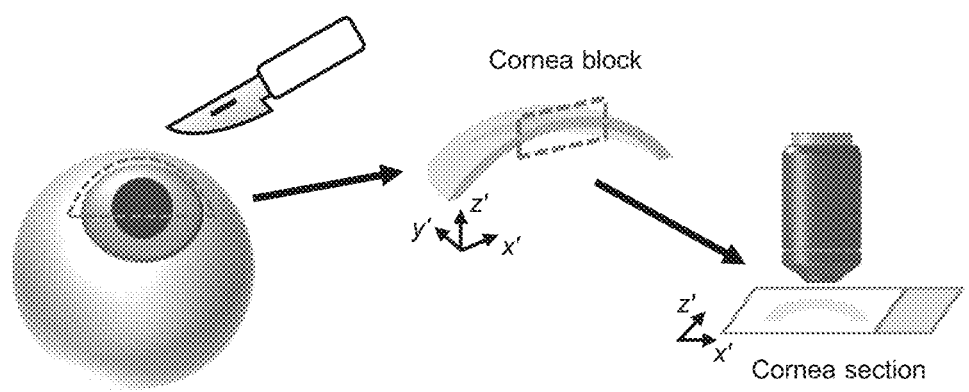
FIG. 5B illustrates a schematic approach for diffusion measurement in cornea sections according to a two-dimensional (2D) measurement approach.
Figure 5C:
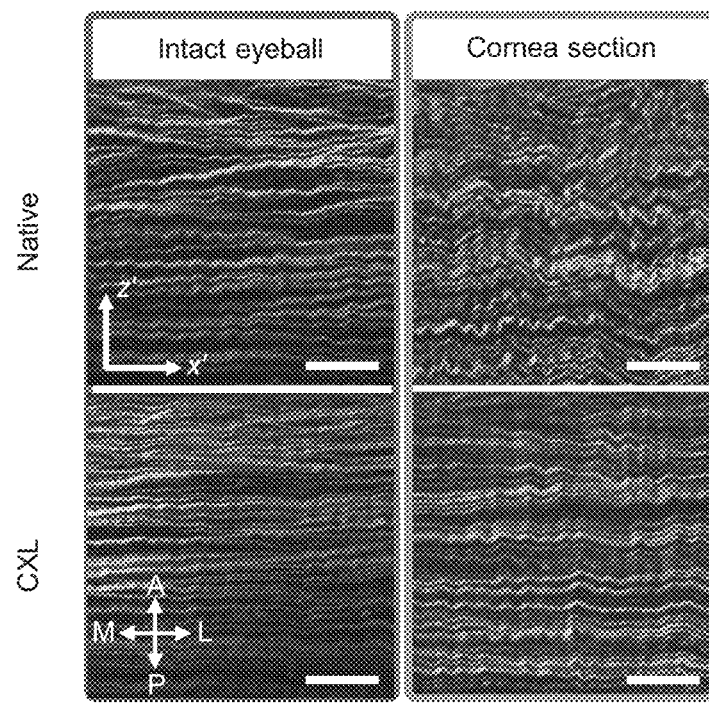
FIG. 5C illustrates representative 2D second harmonic generation (SHG) images of native and collagen crosslinked (CXL) corneas for intact eyeball and cornea section.

FIGS. 5A-5J describe and compare noninvasive 3D LiFT-FRAP measurement versus invasive 2D FRAP measurement in cornea tissues. FIG. 5A presents a schematic of LiFT-FRAP in situ measurement in the cornea of porcine eyeballs. FIG. 5B presents a schematic of 2D FRAP invasive measurement in the cornea sections. In the invasive approach, cornea tissues were first dissected from porcine eyeballs and then cut into thin sections for 2D FRAP measurement. x'-y'-z' is the cornea coordinate system as illustrated in FIG. 5B. FIG. 5C presents representative 2D SHG images of native and CXL corneas in intact eyeballs and cornea sections. In FIG. 5C, the scale bar is 50 µm, and A refers to anterior; P, posterior; M, medial; L, lateral.

Figure 5D:
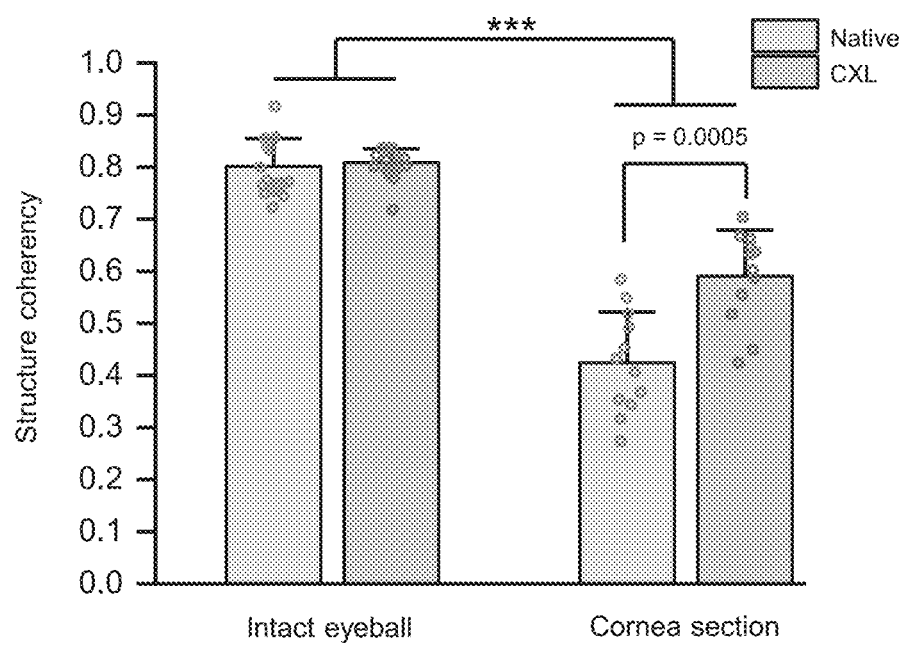
FIG. 5D graphically compares the structure coherency coefficient of collagen fiber alignment in native and CXL corneas for intact eyeball and cornea section.

FIG. 5D presents structure coherency coefficients of collagen fiber alignment in native and CXL corneas based on their 2D SHG images (n=19 measurements from 9 independent native eyeballs, n=21 measurements from 10 independent CXL eyeballs, n=12 measurements from 6 independent native sections, n=12 measurements from 6 independent CXL sections). ***$p<0.0001$, one-way ANOVA with Bonferroni post-hoc test.

Figure 5E:
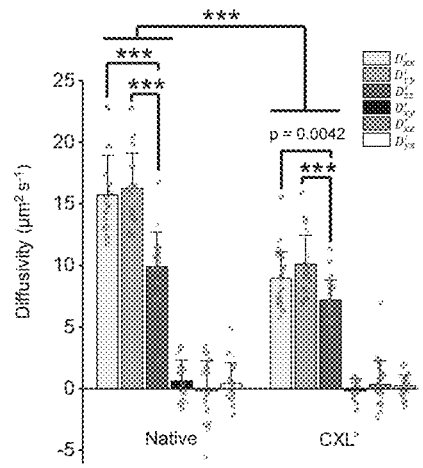
FIG. 5E presents 3D diffusion tensor results as determined according to presently disclosed methods of FD20 in native and CXL corneas.

FIG. 5E presents the 3D diffusion tensor results of FD20 in native (n=21 measurements from 7 independent samples) and CXL (n=25 measurements from 9 independent samples) corneas. Results are presented in the cornea coordinate system through tensor rotation. ***$p<0.0001$, one-way and two-way ANOVA with Bonferroni post-hoc test. FIG. 5F presents the 3D diffusion fractional anisotropy in native (n=21 measurements from 7 independent samples) and CXL (n=25 measurements from 9 independent samples) corneas. p-value was calculated with a two-sided t-test.

Figure 5G:
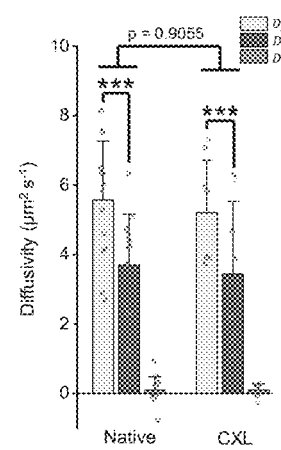
FIG. 5G illustrates 2D FRAP results of FD20 in native and CXL cornea sections.

FIG. 5G presents the 2D FRAP results of FD20 in native (n=14 measurements from 5 independent samples) and CXL (n=8 measurements from 4 independent samples) cornea sections. ***$p<0.0001$, two-way ANOVA with Bonferroni post-hoc test. FIG. 5H presents the diffusion fractional anisotropy as calculated from 2D FRAP results of FD20 in the cornea sections.

Figure 5I:
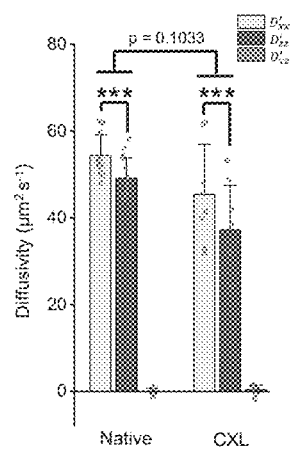
FIG. 5I illustrates 2D FRAP results of sodium fluorescein in native and CXL cornea sections.
Figure 5F:
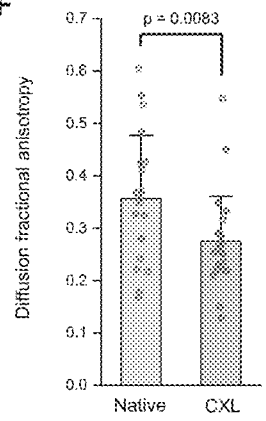
FIG. 5F illustrates 3D diffusion fractional anisotropy as calculated from the 3D results of FD20 in native and CXL corneas.
Figure 5H:
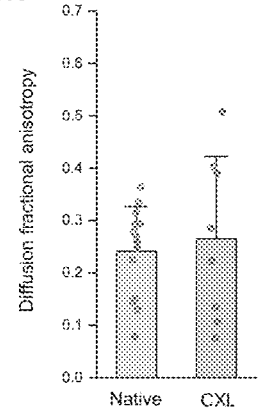
FIG. 5H illustrates diffusion fractional anisotropy as calculated from the 2D FRAP results of FD20 in native and CXL cornea sections.
Figure 5J:
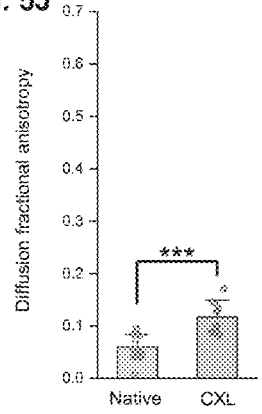
FIG. 5J illustrates diffusion fractional anisotropy as calculated from the 2D FRAP results of sodium fluorescein in native and CXL cornea sections.

FIG. 5I presents the 2D FRAP results of sodium fluorescein in native (n=15 measurements from 5 independent samples) and CXL (n=8 measurements from 4 independent samples) cornea sections. *$p<0.0001$, two-way ANOVA with Bonferroni post-hoc test. FIG. 5J presents the diffusion fractional anisotropy calculated from the 2D FRAP results of sodium fluorescein in native (n=15 measurements from 5 independent samples) and CXL (n=8 measurements from 4 independent samples) cornea sections. *$p<0.0001$, two-sided t-test. All data depict mean±standard deviation.

Figure 6A:
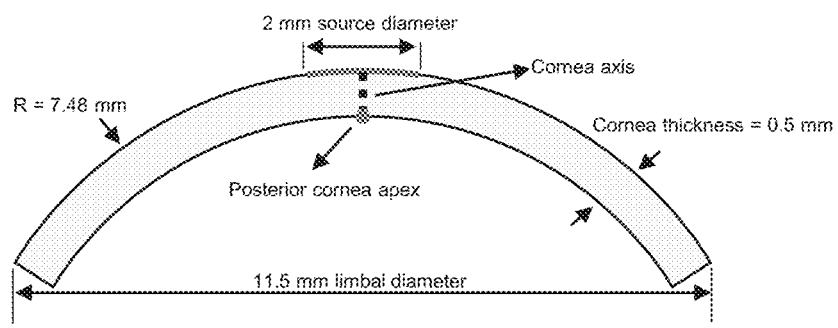
FIG. 6A schematically illustrates cornea geometry utilized for a computational simulation experiment.
Figure 6B:
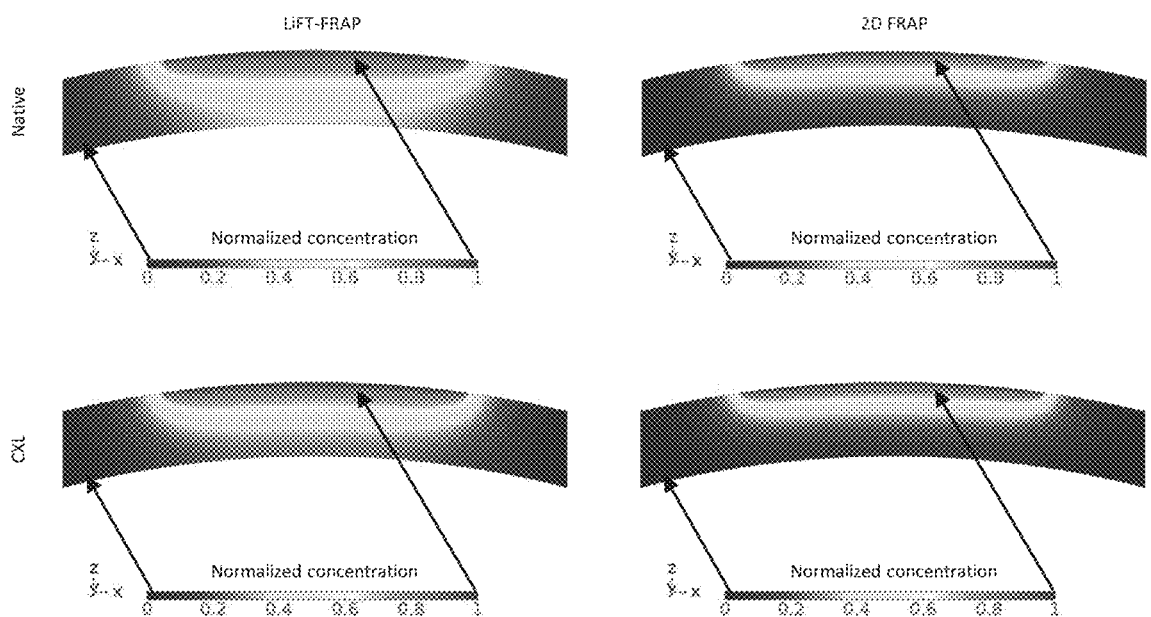
FIG. 6B illustrates molecular concentration profiles within the central region of cornea tissue obtained by a computational simulation experiment.
Figure 6C:
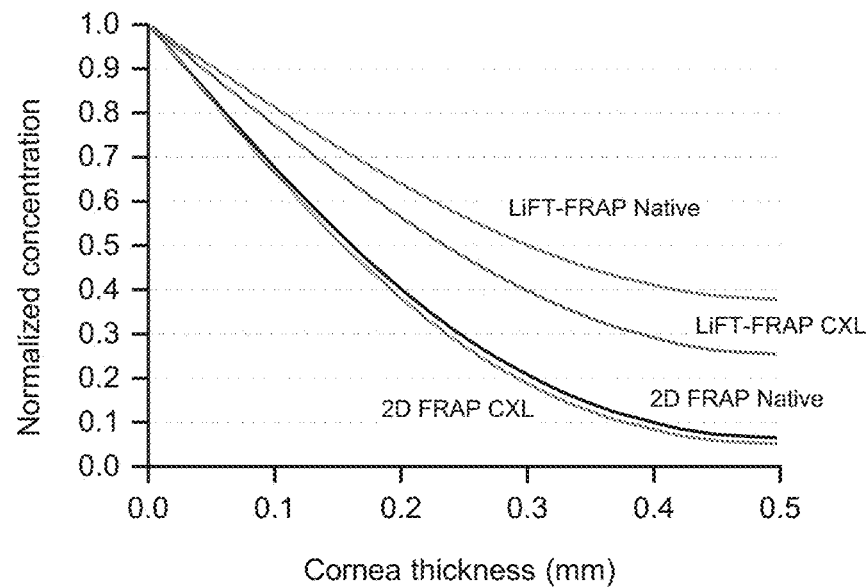
FIG. 6C compares molecular concentration profiles obtained across the cornea axis via different methodologies according to the computational simulation experiment.
Figure 6D:
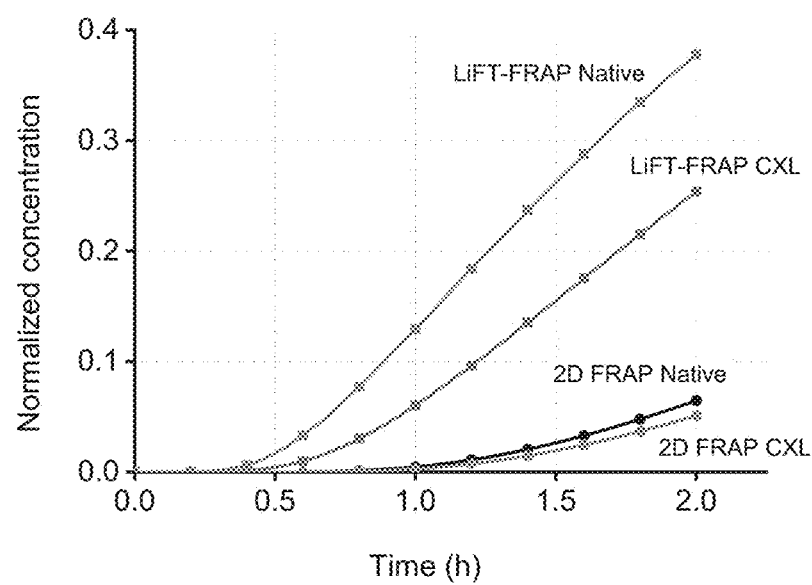
FIG. 6D compares molecular concentration profiles obtained at the posterior cornea apex via different methodologies according to the computational simulation experiment.

FIGS. 6A-6D illustrate the results of computational modeling of molecular distribution in cornea tissues. FIG. 6A schematically illustrates the cornea geometry used for the computational simulation experiment. A portion of the anterior cornea with a radius of 1 mm was set as a constant molecular source, which is indicated by the dark arch. The dotted line indicates the cornea axis. The dot indicates the posterior cornea apex. Zero-flux boundary condition was applied to all of the boundaries in the simulation. FIG. 6B illustrates molecular concentration profile within the central region of cornea tissue at a time of 2 hours with the diffusivities measured from LiFT-FRAP (left) and 2D FRAP (right). FIG. 6C graphically illustrates molecular concentration profile across cornea axis (dotted line in FIG. 6A) at a time of 2 hours comparing the LiFT-FRAP results and 2D FRAP results as the diffusion input. FIG. 6D graphically illustrates molecular concentration at the posterior cornea apex (dot in FIG. 6A) comparing the LiFT-FRAP results and 2D FRAP results as the diffusion input.

Figure 7:
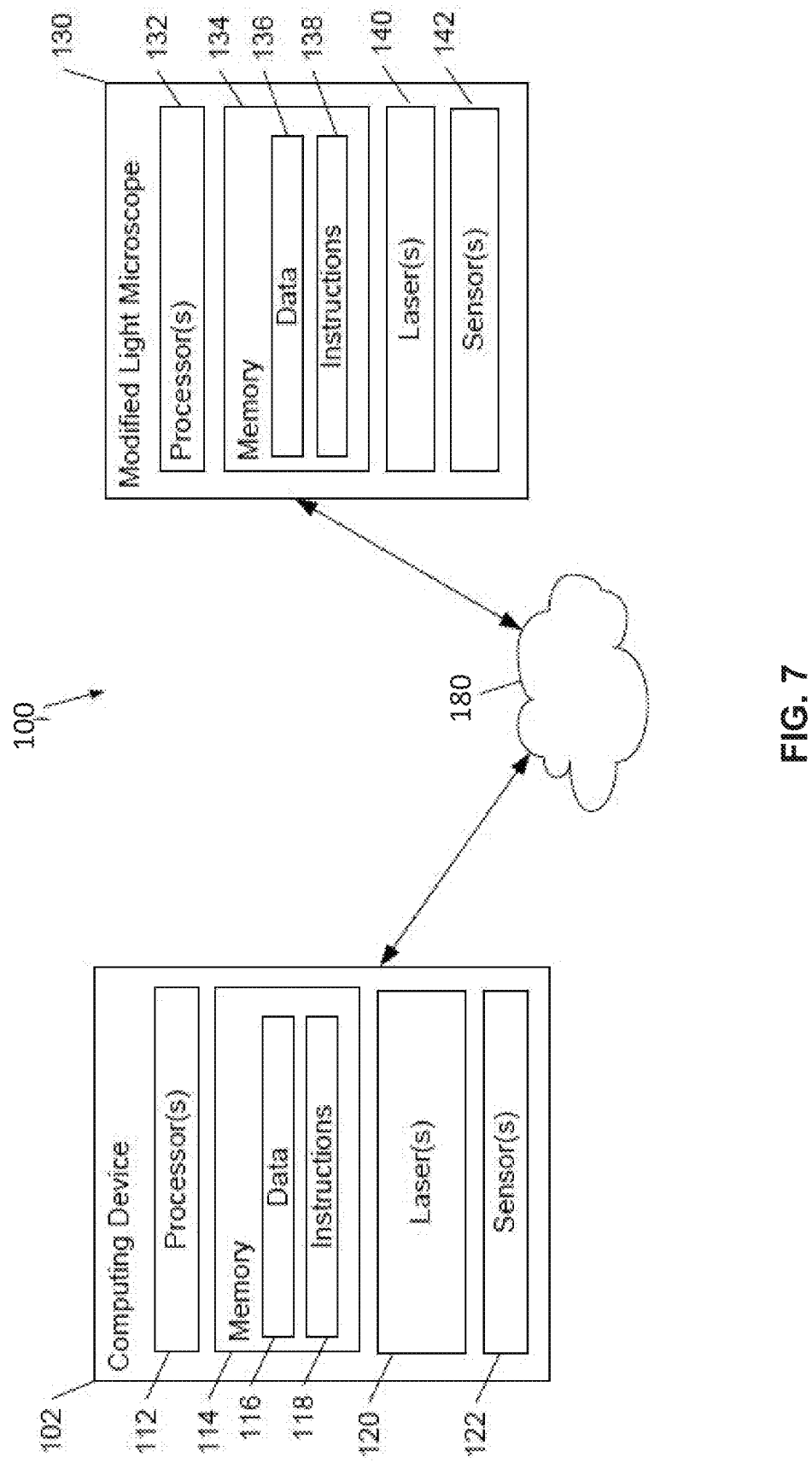
FIG. 7 illustrates an example computing system according to example aspects of the present disclosure.

FIG. 7 depicts a block diagram of an example computing system 100 that can store or transmit information such as instructions for determining the 3D diffusion tensor and/or adjusting components of a 3D light microscope according to example aspects of the present disclosure. In one example implementation, the system 100 can include a computing device 102 and a 2D light microscope 130 that are communicatively coupled over a network 180.

The computing device 102 can include one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the sensor system 102 to perform operations.

In some implementations, the computing device 102 can store or include the one or more lasers 120 and/or one or more sensors 122 for acquiring emission data (e.g., fluorescence intensity) of a volume of a material according to implementations of the present disclosure.

Additionally or alternatively, the one or more lasers 120 and/or one or more sensors 122 for acquiring emission data can be included in and implemented by the 2D light microscope 130 that can receive instructions for acquiring data by the one or more sensors 142 from the computing device 102 via communication over a network 180 according to various communication protocols.

The 2D light microscope 130 can include one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the 2D light microscope 130 to perform operations.

The network 180 can various communications networks, such as a local area network (e.g., intranet), wide area network (e.g., Internet), or some combination thereof, and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL). While FIG. 7 illustrates one example computing system that can be used to implement the present disclosure, it should be understood that other computing systems can be used as well.

Figure 8:
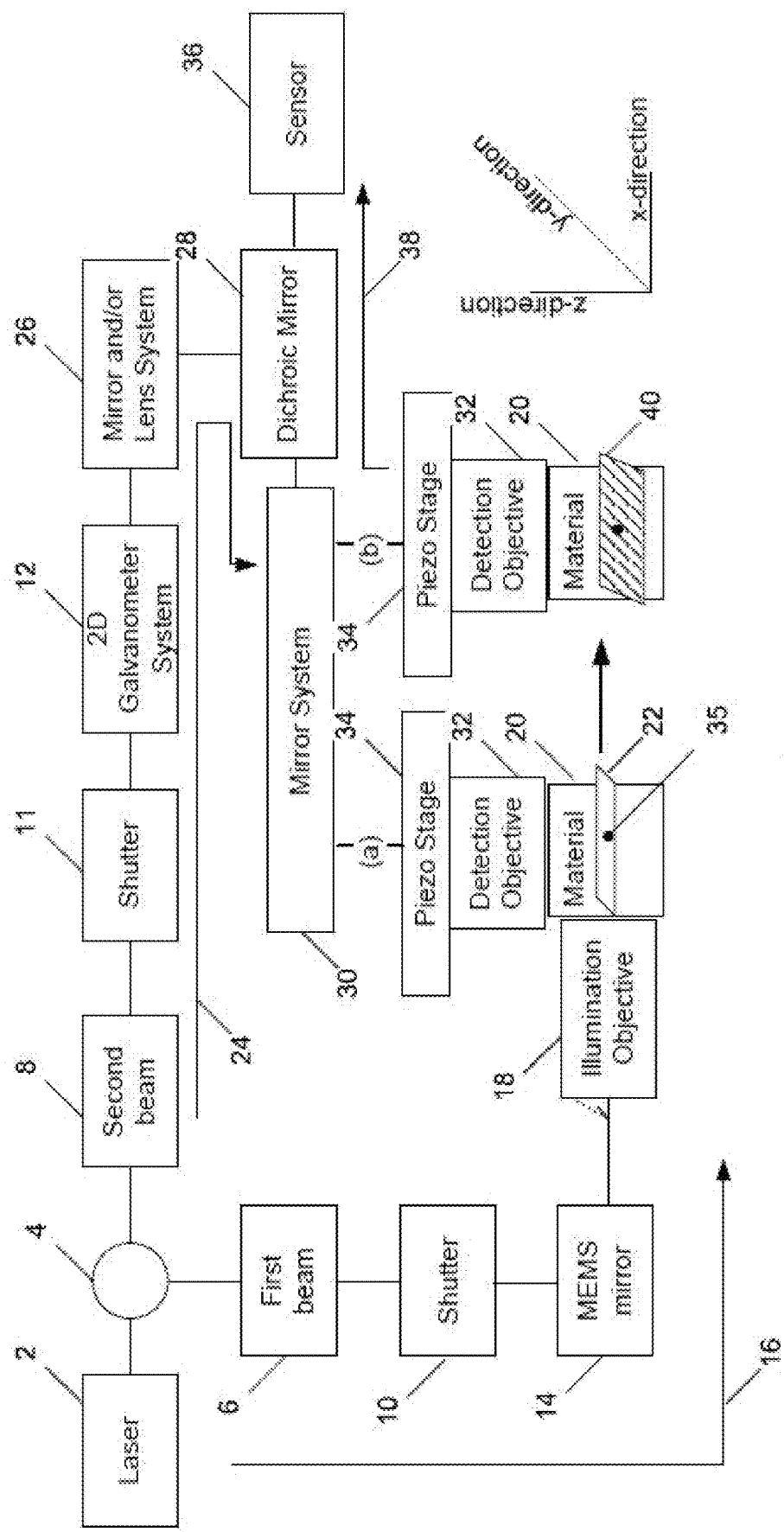
FIG. 8 illustrates a system diagram for an example implementation of the present disclosure according to example aspects of the present disclosure.

FIG. 8 illustrates an example system diagram for a modified light microscope according to certain example implementations of the present disclosure. The modified light microscope can be used to generate and/or acquire emission data over a 3D volume of a material. As illustrated, the modified light microscope can include a laser 2 directed to transmit a laser beam along a path to contact a splitter 4 that splits the laser into a first beam 6 and a second beam 8. Each of the first beam 6 and the second beam 8 can travel along independent light pathways that direct the irradiation from the first beam 6 and/or the second beam 8 to reach a material 20. As should be understood, while laser 2 is illustrated as a single beam that is split by the splitter 4, alternative implementations can include two or more lasers that can be independently triggered to achieve the same effect as the laser 2 and splitter 4 combination shown in FIG. 8.

One aspect of directing the radiation from the laser 2 along each light pathway can include one or more shutters 10 11 that can operate to prevent the first beam 6 and/or the second beam 8 from reaching components downstream of the shutter(s) 10 11. As illustrated, the first beam 6 can be directed along an illumination path 16 to reach the MEMS mirror 14, and subsequently, the material 20. Additionally, the second beam 8 can be directed along a bleaching path 24 to reach the mirror system 30, and subsequently, the material 20. Further, the shutter(s) 10 11 can be configured to operate in a closed form that allows substantially no radiation to pass the shutter and/or an open form that allows substantially all radiation to pass the shutter. Thus, the shutter 10 can be configured to prevent radiation associated with the first beam from being transmitted along the illumination path 16 and shutter 11 can be configured to prevent radiation associated with the second beam from being transmitted along the bleaching path 24.

More particularly, when shutter 11 is open, substantially all radiation from the second beam 8 can pass to reach the 2D galvanometer system 12, and when shutter 11 is closed, substantially none of the radiation from the second beam 8 can pass to reach the 2D galvanometer system 12. Similarly, when shutter 10 is open, substantially all radiation from the first beam 6 can pass to reach the MEMS mirror 14, and when shutter 10 is closed, substantially none of the radiation from the first beam 6 can pass to reach the MEMS mirror 14.

In this manner, the shutter 10 can control passage of the first beam along the illumination light path 16, which extends past the MEMS mirror 14 to the illumination objective 18 to reach the material 20. The MEMS mirror 14 provides one example for generating a 2D light plane 22 from a light source (e.g., laser 2). Other possible implements for projecting a laser to produce a 2D light sheet or plane 22 may also be used, such as partially filling the back aperture of the illumination objective 18.

Additionally, the shutter 11 can control passage of the second beam along the bleaching light path 24 which extends past the 2D galvanometer system to the mirror, and/or lens system 26 which can be included in some implementations to direct, and/or focus the second beam 8 to provide a wavelength that effectively bleaches the excitable molecule present in the material 20. The second beam can also pass a dichroic mirror 28 which can direct the second beam to a mirror system 30 configured to direct the second beam 8 to the detection objective 32 and the material 20. For focusing the second beam, the detection objective 32 can be mounted on a piezo stage 34 that can be translated along one or more of the x-direction, y-direction, and z-direction. However, other control elements can alternatively be utilized as would be evident to one of skill in the art, such as electric liquid lenses (Optotune) or tunable acoustic index gradient (TAG) lenses, which can scan the z direction in high speed. XY-scanning can be also implemented by scanners such as resonant galvo, electro- or acousto-deflectors, as well as by use of resonant fiber scanners.

One aspect of the example modified 2D light microscope can include a single pathway that can be used to perform bleaching (a) and detection (b). For example, the first beam 6 can be used to generate a light sheet 22 and the second beam 8 can be used to bleach a region 35 of the light sheet 22 by direction of the second beam 8 through the dichroic mirror 28 and the mirror system 30. Additionally, the data descriptive of the excitation wavelength of the excitable molecule in the material can be captured by the sensor 36 along a similar path through the mirror system 30 and the dichroic mirror 28. For instance, after bleaching the region 35 of the light sheet 22, data for the emission wavelength can be acquired for a 3D volume 40 of the material by passing the radiation to the mirror system 30 which directs the radiation to the dichroic mirror 28. As should be understood, dichroic mirrors in general provide a material that selectively allows some wavelengths to pass while reflecting others. In this manner, the emission wavelength emitted from the 3D volume 40 can be directed to the sensor 36.

Figure 9:
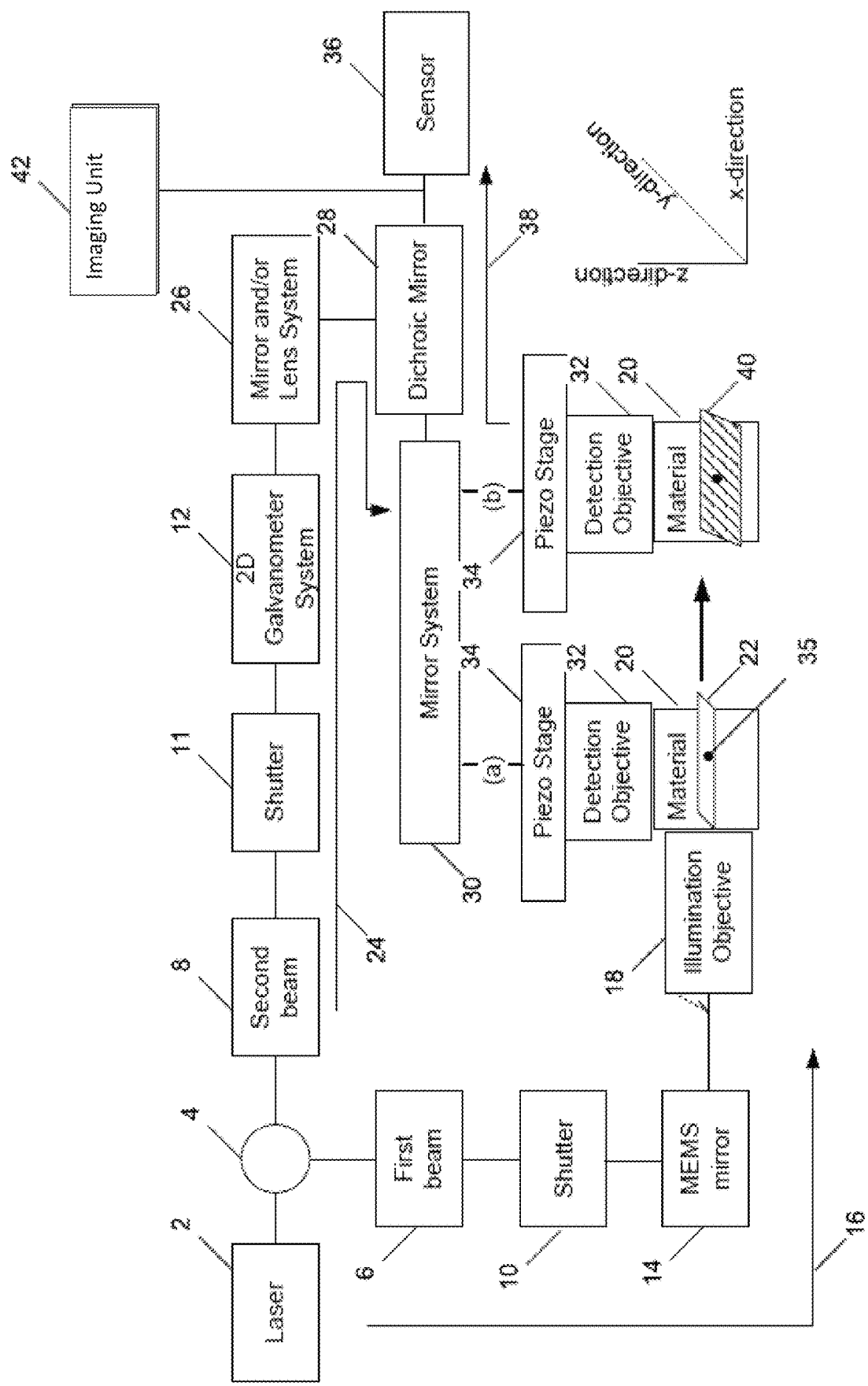
FIG. 9 illustrates a system diagram for another example implementation according to example aspects of the present disclosure.

FIG. 9 illustrates an alternative implementation of the example system diagram shown in FIG. 8, including an imaging unit 42, e.g., a structure imaging unit. The imaging unit 42 can include a source (e.g., one or more lasers) for generating an imaging event (e.g., two-photon excitation) and a detector (e.g., photomultiplier tube) for sensing and/or recording a response signal. In some implementations, the source can be the laser 2 used to generate the second beam 8. Alternatively, one or more separate lasers can be included as part of the modified light microscope for producing an imaging event. For some implementations, the imaging unit 42 may include further components for directing a response signal to the detector. For instance, some implementations may record the response signal along the same detection path as the detection objective 32. To accomplish this, an imaging unit 42 can include lenses and/or mirrors (e.g., dichroic mirrors) along the detection path 38 for directing the response signal to the detector of the imaging unit 42.

While exemplified throughout the present disclosure as creating a bleaching volume and/or photobleaching a portion of the 3D volume, it should be understood that variations to modify the portion of the 3D volume are also contemplated. For example, generally, bleaching may be considered as a photo-stimulation event. Some example photo-stimulation events can include one or more of photobleaching the portion of the 3D volume, photoactivating the portion of the 3D volume, and/or photoconversion of the portion of the 3D volume.

The present disclosure may be better understood with reference to the examples set forth below in combination with the Figures.

Example 1

Methods and Materials
LiFT-FRAP Setup

An example LiFT-FRAP system, illustrated in FIG. 2A and diagrammed in FIG. 7, includes of three functional units: (A) a light sheet unit that generates a two-photon excitation light sheet to illuminate a 3D volume ($\lambda_{ill}$ in FIG. 2A); (B) a detection unit that records emitted fluorescence with a high-speed camera (sCMOS in FIG. 2A; and (C) a two-photon bleaching volume generator that creates a 3D bleaching volume with a raster scan of the ultrafast laser beam ($\lambda_{ble}$ in FIG. 2A). The system used an ultrafast laser (Tsunami® HP, Spectra-Physics®, Mountain View, CA) tuned to 800 nm as the light source. The output of the laser was split into two beams by a broadband tunable laser beam splitter composed of a half waveplate (Achromatic Quartz-MgF2 10RP52-2B, Newport, Irvine, CA) and a polarizing beam splitter (05FC16PB.5, Newport, Irvine, CA). The two beams were then fed into the light sheet unit and the bleaching volume generator respectively. Each laser beam was turned on and off by an electric laser shutter (Four-Channel Laser Shutter Driver SR474, Stanford Research System, Sunnyvale, CA). In the light sheet unit, the illumination laser was extended along the x-axis by partially filling the back aperture of the illumination objective (N10XLWD-NIR, 10× NA 0.3, Nikon, Japan). A 2D gimbal MEMS scanning mirror (gold coated, integrated, diameter 800 µm, Mirrorcle Technologies Inc., Richmond, CA) scanned the extended laser along the y-axis to generate a light sheet and along the z-axis to achieve 3D illumination. In the bleaching volume generator, the bleaching laser was reflected by a dichroic mirror (BrightLine® FF662-FDi01, Semrock, Rochester, NY) and focused onto the center of the illuminated 3D volume by the detection objective (N40XLWD-NIR, 40×, NA 0.8, Nikon, Japan). This objective was also used in the detection unit for recording fluorescence images. Mounted on a piezo stage (PIFOC® PD72Z4CAQ, Z-mover, 400 µm, PI, German), the detection objective was driven along the z-axis to allow continuous volumetric bleaching or imaging. To create a 3D bleaching volume, a 2D galvanometer system (GVS002 Dual-Axis Small Beam Galvo/Mirror Assembly, Thorlabs, Inc., Newton, NJ) scanned the bleaching laser in the xy-plane with an area of 10 µm×10 µm, and the piezo stage drove the movement of detection objective in the z-axis by 10 µm. In the detection unit, the emitted fluorescence from the light sheet illumination plane was captured by the detection objective, then passed through the dichroic mirror and a low-pass filter (BrightLine® FF01-665/SP-25, Semrock, Rochester, NY), and was finally focused onto a high-speed sCMOS camera (Zylar 4.2 sCMOS, Andor, UK) via the tube lens (EF 28-135 mm, Canon, Japan). Images had a size of 192 pixels×192 pixels (76 µm×76 µm) and were recorded at 624 frames/s. The 3D imaging was implemented by moving the detection objective along the z-axis in a range of 80 µm while keeping the sample static. Each 3D stack consists of 78 frames, resulting in a 3D imaging rate of 8 volumes/s. During 3D imaging, the light sheet illumination plane was always kept in the focus of the detection objective. Operations of the MEMS mirror, piezo stage, shutters, 2D galvanometer, and camera acquisition were conducted by the control software written in LabVIEW 2014 32-bit (National Instruments™ Austin, TX).

LiFT-FRAP Data Acquisition and Analysis

In each LiFT-FRAP experiment, 3D pre-bleaching images were first recorded at a rate of 8 volumes/s for 10 seconds. The dimension of each LiFT-FRAP 3D volume is 76 µm×76 µm×76 µm, consisting of 64 images with a size of 192 pixels×192 pixels. Then, the central region of the 3D observed volume with a size of 10 µm×10 µm×10 µm was photobleached by the high-power bleaching laser for 1 second. Finally, up to 80 volumes of 3D post-bleaching images were captured at the same rate as the pre-bleaching images, 8 volumes/s. LiFT-FRAP experimental settings for each sample type in this study are listed in Table 1. To obtain images with homogenous background, each post-bleaching image was normalized by its corresponding pre-bleaching image (Supplementary Methods and Materials). The normalized LiFT-FRAP images were then used to calculate the 3D diffusion tensor, D, $$D = \begin{bmatrix} D_{xx} & D_{xy} & D_{xz} \\ D_{xy} & D_{yy} & D_{yz} \\ D_{xz} & D_{yz} & D_{zz} \end{bmatrix}$$

based on a 3D spatial Fourier transform FRAP theory. A custom MATLAB® code (MATLAB® 2017a, MathWorks®, Natick, MA) was written to perform all of the data analysis, such as solving equations disclosed herein to determine the 3D diffusion tensor. All LiFT-FRAP experiments were performed at room temperature (20° C.).

Diffusion Anisotropy Quantification

To quantify the 3D diffusion anisotropy of fluorescent molecules in scaffolds and biological tissues, fractional anisotropy (FA) was defined as, $$FA = \frac{\sqrt{[(\lambda_1 - \lambda_2)^2 + (\lambda_1 - \lambda_3)^2 + (\lambda_2 - \lambda_3)^2]}}{\sqrt{2[\lambda_1^2 + \lambda_2^2 + \lambda_3^2]}}$$

where $\lambda_1$, $\lambda_2$, and $\lambda_3$ are the principal diffusivities of the 3D diffusion tensor. To calculate the diffusion anisotropy from 2D FRAP results, $\lambda_3$ was assumed to be identical to $\lambda_2$, the larger principal diffusivity of the 2D diffusion tensor. Diffusion fractional anisotropy is a scalar value in a range of zero to one, where a value of zero indicates pure isotropic diffusion, while a value of one indicates pure unidirectional anisotropic diffusion.

LiFT-FRAP Sample Preparation

Solution samples: Four different 0.1 mM sodium fluorescein (376 Da, Fluka™ Sigma-Aldrich®, St. Louis, MO) glycerol/phosphate buffered saline (1×PBS) (Sigma®, St. Louis, MO) solutions were prepared at four different glycerol concentrations (v/v: 55%, 60%, 70%, 80%). Three unique 10 mg/ml fluorescein isothiocyanate-dextran (FD) 60% glycerol/PBS solutions were made with three different fluorescent molecules (4, 10, 40 kDa FD, Sigma®, St. Louis, MO) (FD4, FD10 and FD40). A total of 25 µL of these fluorescent glycerol solutions were pipetted into square glass tubes (inner dimension: 0.8 mm×0.8 mm×50 mm, wall thickness: 0.16 mm) (#8280, VitroCom, Mountain Lakes, NJ), and both ends of the glass tube were immediately sealed with soft silicone putty to prevent leakage and convection.

Porcine cornea samples: Fresh porcine (Yorkshire, 6 months) eyeballs were obtained from a local abattoir and used within 12 hours postmortem to determine the 3D diffusion tensor of FD20 in corneas. Eyeballs were stored in moist chambers with PBS-soaked gauze at 4° C. until use. The cornea epithelial layer of each eyeball was completely removed with a blunt Hockey knife. To determine the impact of CXL, an FDA-approved medical procedure for keratoconus patients, on cornea diffusion properties, two types of porcine corneas were prepared: native corneas and CXL corneas. Native corneas were stained with 20 kDa FD (FD20) by sequentially applying 20 mg mL$^{-1}$ FD20 in 1×PBS solution for 10 minutes for fast dye infiltration and 20 mg mL$^{-1}$ FD20 in 20% PBS-based Dextran-T-500 (Sigma®, St. Louis, MO) for 15 minutes to bring cornea thickness back to its initial thickness before staining. CXL corneas were first treated by a standard epithelium-off CXL protocol. Briefly, drops of 0.1% riboflavin-5-phosphate (Sigma-Aldrich®, St. Louis, MO) in 20% PBS-based Dextran-T-500 (Sigma®, St. Louis, MO) were topically applied to the cornea every 5 minutes for 30 minutes. Then, the central part of the cornea was subjected to 3.0 mW ultraviolet A (UVA, 370 nm) light for 30 minutes. During UVA irradiation, riboflavin drops were added every 5 minutes. After UVA irradiation, CXL corneas were stained with 20 mg mL$^{-1}$ FD20, 20% PBS-based Dextran-T-500 solution for another 30 minutes. Eyeballs were then transferred to a custom specimen holder and capped with a thin fluorinated ethylene propylene (FEP) film (DuPont Teflon™ FEP 50A, American Durafilm, Holliston, MA), with a refractive index similar to water, to cover the central region of the porcine corneas. Cornea thickness was measured with a pachymeter (iPac® Pachymeter, Reichert®, Depew, NY) along the way of sample preparation.

Rat tail tendon samples: Fresh rat tails were harvested from Sprague Dawley rats (3 months old, 250 g). The tails were used within 12 hours of killing to determine the 3D diffusion tensor of sodium fluorescein in tail tendons. Rat tails were stored in a moisture chamber with PBS soaked gauze at 4° C. until use. To prepare rat tail tendon specimens, tendon fascicles were excised from tendon bundles and placed inside glass tubes. To investigate the impact of tissue structure and composition changes on 3D diffusion properties, rat tail tendons were thermally treated for different amounts of time. Three types of rat tail tendons were prepared: healthy tendons, partially denatured tendons, and fully denatured tendons. Healthy tendons were stained in 0.1 mM sodium fluorescein glycerol/PBS solution (v/v: 60%) at room temperature for 2.5 hours. Partially and fully denatured tendons were immersed in the staining solution at 70° C. for 5 minutes and 30 minutes, respectively, before resting in staining solution at room temperature for 2 hours.

Hydrogel samples: Homogenous gelatin gel was prepared at different concentrations (w/w: 2%, 5% and 8%), mixed with 70 kDa FD (FD70) (Sigma®, St. Louis, MO) to reach a final dye concentration of 10 mg/ml. FD70 powder and gelatin powder (Gelatin from porcine skin, Sigma®, St. Louis, MO) were fully mixed with deionized water and incubated in a 70° C. water bath for 15 minutes to completely melt the gelatin. Subsequently, 25 µL fluorescent gelatin solution was immediately pipetted into the square glass tubes before resting at room temperature until fully gelled.

Fiber-based scaffold samples: Fiber-based gelatin scaffolds were fabricated through electrospinning (FIG. 3B) with two different fiber alignments: aligned and random (FIG. 3C, FIG. 3D). 200 mg/ml gelatin solution was prepared by dissolving gelatin powder (Gelatin from porcine skin, Sigma®, St. Louis, MO) in 75% (v/v) acetic acid (Sigma-Aldrich®, St. Louis, MO) solution. Gelatin solution was then transferred to a 10 ml syringe with a 23 G needle and pumped out of the 10 ml syringe by 3 mmHg of pressure with a custom hydraulic system. Electrospinning was performed at 14 kV and 60% humidity, with the needle tip 10 cm from the grounded mandrel (diameter=51 mm, width=3 mm). For the fabrication of fiber-aligned scaffolds, the grounded mandrel was rotated at 1,200 rpm. For the fabrication of random fiber scaffolds, the grounded mandrel was held static. Both scaffolds were collected after 4 hours of electrospinning and dried in a petri dish at room temperature for 2 days. To prevent gelatin fibers from dissolving in the water-based staining solution, 3D scaffolds were crosslinked with 200 mM 1-ethyl-3-(3Dimethylaminopropyl)carbodiimide hydrochloride (EDC) (#22980, Thermo Fisher Scientific™, Waltham, MA) and N-Hydroxysuccinimide (NHS) (#130672, Sigma-Aldrich®, St. Louis, MO), 100% ethanol solution overnight. After crosslinking, fiber-based scaffolds with a fiber diameter of ~200 nm were placed in glass tubes and stained in 10 mg/ml FD10 or 20 kDa FD (FD20), 40% glycerol/water solution for one day at room temperature.

2D FRAP in Solution Samples

2D FRAP experiments were performed to measure the diffusivity of standard probes in solutions as a reference for LiFT-FRAP results. A 0.1 mM sodium fluorescein glycerol solution (glycerol concentrations: 55%, 60%, 70% and 80%) and 10 mg/ml FD solutions (FD4, FD10 and FD40) were prepared following the same protocol used for LiFT-FRAP solution experiments. Fluorescent solutions were placed into a thin well chamber made using a double-side adhesive spacer (9 mm in diameter and 0.12 mm in thickness, Secure-Seal™ spacers, Life Technologies, Grand Island, NY) on a slide. A coverslip was then used to seal the chamber.

Porcine cornea samples: Corneas were first dissected out from both native and CXL porcine eyeballs, sap frozen, and then cut into 120 µm thin cornea sections with a cryostat (Leica® CM1510S, Leica Microsystem, Inc., Exton, PA). Cornea sections were carefully placed into a thin well chamber made with a double-side adhesive spacer on a slide. Then fluorescent solutions were immediately added to stain the tissue sections. To determine the diffusion of FD20 in cornea sections, 10 mg mL$^{-1}$ FD20 in 17.5% PBS-based Dextran-T-500 solution was used. Dextran was used to prevent cornea sections from swelling. For diffusion measurement with fluorescein in cornea sections, 0.2 mM sodium fluorescein in 17.5% PBS-based Dextran-T-500 solution was used. After one-hour incubation, excessive fluorescent solutions were removed, and the well with cornea sections was sealed with a coverslip.

2D FRAP procedure: The 2D FRAP experiments were performed on a Leica® TCS-SP5 confocal laser scanning microscope (Leica Microsystem, Inc., Exton, PA) with an Ar-488 nm laser and an HC PlanAPO 20×/0.7NA air objective (Leica Microsystem, Inc., Exton, PA). Briefly, the imaging position was set to 7 µm beneath the coverslip, and five pre-bleaching images plus 200 post-bleaching images (128 pixels×128 pixels) were recorded at low laser intensity (3-7%). To avoid photobleaching artifacts during the long post-bleaching imaging process, imaging settings for slow diffusing molecules were different from fast-diffusing molecules, with frame size varied from 775 µm×775 µm to 258 µm×258 µm and frame rate varied from 0.355 to 1.065 seconds per frame, depending on probe diffusivity. For bleaching, laser intensity was increased to 100% to bleach a square region with a side length of ⅛ of the pre-bleaching image, located at the image center. Pre-bleaching images were averaged and subtracted from post-bleaching images, which were then analyzed with a custom MATLAB® code to calculate 2D FRAP diffusivities.

SEM Imaging

Fiber structure of the fiber-based scaffolds (aligned and random) were determined by scanning electron microscopy (SEM). Scaffolds collected from the mandrel were coated with a 20 nm gold layer before SEM imaging to improve image contrast. High-resolution SEM images were taken with a S-3700N SEM (Hitachi, Japan) at 5,000× magnification.

SHG Imaging

Second harmonic generation (SHG) imaging was performed to determine collagen fiber structure in rat tail tendons (healthy and thermally treated) and porcine corneas (native and CXL). For rat tail tendons, fresh glycerol-cleared tendon samples were transferred to a glass bottom petri dish (Cellvis, Mountain View, CA) for SHG imaging. For porcine corneas, whole eyeballs with cornea epithelial layer removed were first fixed in 10% formalin solution (Fisher Scientific™, Hampton, NH) to preserve the collagen fiber structure. After fixation, cornea tissues were dissected and cut in half along the mediolateral direction with a scalpel blade. The transverse plane of each cornea was placed face down against the glass bottom of the petri dish. SHG images were taken with a 60× oil immersion lens (UApo N, NA 1.30, Olympus, Center Valley, PA) on an inverted Olympus FLUOVIEW® FV1200MPE multiphoton laser scanning microscope (Olympus, Center Valley, PA). SHG microscopy excitation wavelength was set to 860 nm, and SHG signal was collected in the 420-460 nm range. For SHG imaging of rat tail tendons, the image plane was set to 150 µm beneath the surface. For SHG imaging of porcine corneas, 2D images were taken at the surface of the transverse plane, while 3D stack SHG images were taken from the surface of the transverse plane down to a depth of 80 µm. The distance between sequential images is 1 µm. For SHG imaging of rat tail tendons, the image plane was set to 150 µm beneath the surface.

Picrosirius Red Staining and Imaging

Picrosirius red staining was used to determine collagen fiber structure in rat tail tendons (healthy and thermally treated) and porcine corneas (native and CXL). Rat tail tendons and porcine corneas were fixed in 10% formalin solution, dehydrated, and paraffin embedded. 5-µm thick tissue sections were cut, dewaxed in xylene, and dehydrated in graded ethanol solutions. Slides were stained in sirius red 0.1% in saturated picric acid solution (Electron Microscopy Sciences, Hatfield, PA) and then imaged with a 20× objective (UPlanSApo, NA 0.75, Zeiss, Germany) on an Olympus BX53 microscope (Olympus, Center Valley, PA). Picrosirius red staining images were captured under polarized light to detect collagen birefringence signal against the dark field of view. Bright field images were also taken under bright light at the same sample location immediately following polarization imaging.

Fiber Alignment Quantification

Fiber alignments of fiber-based scaffolds (aligned and random), rat tail tendons (healthy and thermally treated), and porcine corneas (native and CXL) were quantified based on SEM images (for fiber-based scaffolds) and 2D SHG images (for rat tail tendons and porcine corneas). An ImageJ 1.52a (National Institutes of Health, Bethesda, MD) plug-in, OrientationJ, was used to determine the coherency coefficient of the fiber structure in all the samples. The coherency coefficient is in the range of zero to one, where a coherency coefficient of zero indicates fibers are perfectly randomly distributed without a predominant orientation, while a coherency coefficient of one indicates all fibers are aligned in the same direction. Thus, generally this parameter can be used to quantify tissue structure (e.g., collagen fiber structure) anisotropy.

Water Content Measurement

The water content in rat tail tendons (healthy and thermally treated) was measured and compared to determine tissue composition changes. The wet weight, $w_{wet}$, of each rat tail tendon was first measured by a Sartorius balance (LA 120 S, Germany). Subsequently, tissue samples were lyophilized and specimen dry weight, $w_{dry}$, was measured. Water content was calculated by $$\frac{w_{wet} - w_{dry}}{w_{wet}} \times 100\%.$$

Statistical Analysis

A one-way ANOVA with Bonferroni post-hoc test was performed to determine the differences among diagonal diffusion tensor components ($D_{xx}$, $D_{yy}$, and $D_{zz}$), as well as the differences in fractional anisotropy in scaffold experiments, and the differences in fractional anisotropy, coherency coefficient, and water content among three groups of rat tail tendons (healthy and thermally treated). A two-way ANOVA with Bonferroni post-hoc test was applied to determine 3D diffusion differences among different experiment groups with experimental conditions and diffusion direction as the fixed factors. An independent two-sided t-test was performed to determine differences in coherency coefficient between two groups of scaffolds (aligned and random) and differences in fractional anisotropy, coherency coefficient, and cornea thickness in two groups of porcine corneas (native and CXL). When multiple measurements were performed at different locations in the same sample, measurement location was taken as a covariate for the analysis. All analyses were performed in SPSS® (IBM® SPSS® Statistics, Version 24.0, IBM® Corp., Armonk, NY). Significant differences were reported at $\alpha<0.05$, with descriptive statistics reported as mean±standard deviation.

Supplementary Methods and Materials

Modeling 3D Molecular Dynamics and Concentration Distributions

To characterize the impact of isotropic and anisotropic diffusion on 3D molecular dynamics and concentration distributions, we developed a computational model to simulate the process of molecules diffusing out from a central source, such as cells, within a 3D domain. The spherical subdomain at the center of the cubic domain had a diameter of 10 µm and was assigned a constant concentration as the molecular source. The 3D cubic domain with side length 40 µm had a no-flux boundary condition, and its initial concentration was set to zero. The molecular concentration profile was governed by the diffusion equation (Fick's second law) (Eq. 1):

$$\frac{\partial}{\partial t} C(x, y, z, t) = \nabla \cdot \{D[\nabla C(x, y, z, t)]\} \quad (1)$$

where (x, y, z) is the spatial position, t is time and D, defined below, is the 3D diffusion tensor of the diffusing molecules, $$D = \begin{bmatrix} D_{xx} & D_{xy} & D_{xz} \\ D_{xy} & D_{yy} & D_{yz} \\ D_{xz} & D_{yz} & D_{zz} \end{bmatrix}$$

and C(x, y, z, t) is the concentration of diffusing molecules.

To simplify the simulation, an assumption was applied that diffusion occurs only along the principal directions, which results in $$D = \begin{bmatrix} D_{xx} & 0 & 0 \\ 0 & D_{yy} & 0 \\ 0 & 0 & D_{zz} \end{bmatrix}.$$

Four 3D diffusion tensors, with an identical average diffusivity of 10 µm²/s but different diffusion anisotropies (FIG. 1C), were simulated to reveal the differences between isotropic diffusion and anisotropic diffusion. All models were solved using finite element analysis software (COMSOL Multiphysics® 5.4, COMSOL Inc., Burlington, MA). To evaluate the modeling results, all concentrations were normalized to the source subdomain value, and magnitudes of all diffusion fluxes $J=-D[\nabla C(x, y, z, t)]$ were normalized to the maximum magnitude of diffusion flux among all models at each time point. The normalized concentration distribution profile and diffusion flux among different models were compared in three orthogonal planes at each time step. In addition, normalized concentration profiles from the source to the edge of the cubic domain were compared along each axis for each model at each time step.

LiFT-FRAP System Control

The voltage control signals of the LiFT-FRAP system operation were provided by two DAQ boards (PCI-6115 and PCI-6713, National Instruments™, Austin, TX) synchronized with an RTSI bus cable. A customized software (available upon request) written in LabVIEW 2014 32-bit 6 (National Instruments™, Austin, TX) managed the timing and all waveforms of control signals applied to the MEMS mirror, piezo stage, shutters, 2D galvanometer system, and sCMOS camera. Each control signal uses different waveforms in the bleaching and 3D imaging cycles. During the bleaching period, the control voltage for the MEMS mirror was set at a fixed level, leading to none scanning of the MEMS mirror. Instead, the piezo stage was driven by a sinusoidal waveform with the frequency of 4 Hz, which allowed the scanning of the focused bleaching laser along the z-axis, and the amplitude was set to have a 10 µm range of movement along the z-axis. To create a 3D bleaching volume, the 2D galvanometer system was controlled by two sinusoidal waveforms with the frequency of 50 Hz and 500 Hz to concurrently scan the bleaching laser in the x-axis and y-axis, respectively. The shutter on the bleaching beam path was opened when a high-level digital input/output (I/O) was applied to the shutter controller. The shutter on the light sheet path was kept close while a low-level digital I/O signal was applied. During 3D imaging, including pre-bleaching and post-bleaching, two sinusoidal waveforms were used to control the scanning of MEMS mirror. The fast axis scanning of the MEMS mirror was controlled by a waveform with the frequency of 1,280 Hz, which allowed the scanning of an extended Gaussian beam along the y-axis, generating the light sheet. The slow axis scanning of the MEMS mirror instead was input with a waveform with the frequency of 4 Hz, which permitted the continuous 3D illumination. To acquire 3D in-focus pre-bleaching and post-bleaching images, the movement of the detection plane and illumination plane needs to be synchronized during 3D imaging. We therefore applied a sinusoidal waveform with the same frequency (4 Hz) as the control signal used for scanning the MEMS mirror in the slow axis to drive the movement of piezo stage. The amplitude of control signals for both MEMS and piezo stage were adjusted to achieve 80 µm range of movement for the illumination plane and detection plane along z-axis, respectively. The shutter at the bleaching volume generator was closed with a low-level digital I/O input signal, while the shutter at the light sheet unit was open with a high-level digital I/O input signal. The sCMOS camera was triggered by a voltage pulse to start taking 2D images at 624 frame/s once the bleaching process was finished. The images were streamed and stored in a high-speed M.2 solid state hard drive for post-processing.

LiFT-FRAP 3D Imaging Performance

The extended Gaussian beam was visualized by illuminating sodium fluorescein in 80% glycerol solutions without the scanning of MEMS mirror and by capturing with the sCMOS camera. The full width at the half maximum of the extended Gaussian beam was 4.8±0.3 µm, which was significantly larger than the imaging depth (about 0.5 µm) of the detection objective. The large Raleigh length of the Gaussian beam ensured the field of view to be sufficient for the 3D FRAP experiment. The light sheet was captured by illuminating the in-situ porcine corneas stained with 20 kDa fluorescein isothiocyanate-dextran (FD) at a region close to the tissue surface. In this case, MEMS mirror only scanned along the y-axis to generate the light sheet. In the LiFT-FRAP system, the illumination plane and detection plane were independently scanned over a distance of 80 µm to achieve the 3D imaging. The overlap of the illumination plane and detection plane during 3D imaging is critical. The synchronization of the movement of both planes was ensured by tuning the waveforms applied to the MEMS mirror and piezo stage. To test the movement synchronization of the illumination plane and detection plane during 3D imaging, we measured the dynamic behavior of MEMS mirror and piezo stage in response to the control signal. A 1% agarose gel mixed with fluorescent microsphere (1.75 µm in diameter, Polysciences Inc., Warrington, PA) was prepared for this test. In brief, a constant signal was used to control the piezo stage, which located the detection plane at position $z_d=z_0$. The control signals used for MEMS mirror in LiFT-FRAP experiments were applied to the MEMS mirror to continuously scan the illumination laser in a 3D volume. The sCMOS camera recorded the fluorescent signal from the observed region (76 µm×76 µm) of the detection plane $z_0$ at 624 frames/s. When the position of light sheet illumination plane $z_i$ was overlapped with the $z_d$, the emitted fluorescence signal from the fluorescent microsphere recorded at that time $t_0$ was the brightest. As the position of the detection plane was predefined, $z_d=z_0$, the position of this illumination plane with maximum fluorescence at time to could be determined, $z_i=z_0$. Following the same procedure with a series of the detection plane position ($z_d=z_0, z_1, \ldots z_{99}$), a series of detection plane position $z_i$ can be determined. Each $z_i$ was corresponding to a frame with maximum fluorescence captured at specific time t. Therefore, the dynamic response of MEMS mirror can be reconstructed. In this test, $z_d$ was set in the range of [−50, 50], which was larger than the range of movement of the illumination plane, 80 µm. The results showed that fluorescent signal followed the driving waveform and was detected only within the range of [−40, 40], indicating that the MEMS mirror dynamic response was well controlled. Similarly, to determine the dynamic response of the piezo stage during 3D imaging, the illumination plane was fixed at a given location, while the piezo stage was driven to scan the detection plane in the z direction using the sinusoidal signal. Similar to the procedure for determination of the dynamic response for MEMS mirror, the position of $z_d$ at time t can also be determined. The results also showed the piezo stage was well controlled to move in the range of 80 µm. The dynamic responses of the MEMS mirror and piezo stage were well overlapped, indicating good synchronization of illumination plane and detection plane during 3D imaging.

When the illumination plane exactly overlaps with the focal plane of the detection objective, the image captured by the sCMOS camera is in-focus. Otherwise the image will be blurred. To evaluate the performance of LiFT-FRAP system for 3D imaging, we imaged a fluorescent microsphere (1.75 µm in diameter) in 1% agarose gel. The results showed high contrast 2D images of the microsphere with successful 3D reconstruction of beads distributed in the gel.

Imaging Normalization

In LiFT-FRAP experiments, possible nonuniform distribution of the fluorescent molecules in the samples, uneven illumination, and stripe artifacts caused by the mismatching of the refractive indices along the light sheet propagation direction, will cause a nonuniform image background. To obtain uniform background images, pre-bleaching images were recorded at the start of each LiFT-FRAP experiment. Therefore, each post-bleaching image had its own corresponding pre-bleaching image. By normalizing the post-bleaching image with the pre-bleaching image, as shown in Eq. 2.

$$I_n(x, y, t) = \frac{I_{post}(x, y, t)}{I_{pre}(x, y, t)} \tag{2}$$

where $I_n(x, y, t)$ is the normalized intensity at pixel (x, y) at time t, $I_{pre}(x, y, t)$ and $I_{post}(x, y, t)$ are the intensities at pixel (x,y) at time t in the pre-bleaching image and post-bleaching image, respectively. A uniform background around the bleaching area was obtained.

3D Fourier Transform FRAP Theory

In LiFT-FRAP experiment, 3D fluorescence recovery process after photobleaching is governed by Fick's second law shown in Equation (1). A 3D Fourier transformation can be performed to solve Equation (1) with the boundary condition that C(x, y, z, t) is constant as (x, y, z)→±∞, which reduces to Equation 3, shown below, $$\frac{\hat{C}(u, v, w, t)}{\hat{C}(u, v, w, 0)} = \exp[-4\pi^2(u^2 + v^2 + w^2)D(u, v, w)t], \tag{3}$$

where $\hat{C}(u, v, w, t)$ is defined as $$\hat{C}(u,v,w,t) = \int_{-\infty}^{\infty}\int_{-\infty}^{\infty}\int_{-\infty}^{\infty} C(x,y,z,t)e^{-2\pi i(ux+vy+wz)} dxdydz$$

and D(u, v, w) is defined as $$D(u, v, w) = \frac{u^2 D_{xx} + v^2 D_{yy} + w^2 D_{zz} + 2uvD_{xy} + 2uwD_{xz} + 2vwD_{yz}}{u^2 + v^2 + w^2}, \tag{4}$$

where u, v, and w are the spatial frequencies.

Equation (3) is the basis for the LiFT-FRAP analysis. The value of D(u, v, w) in the spatial frequency domain can be calculated by fitting Equation (3) to the experimental data. To determine individual diffusion tensor component, the average value of D(u, v, w) is calculated over a spherical surface in spatial frequency domain:

$$D_{\alpha 1, \alpha 2, \beta 1, \beta 2} = \frac{\iint D(u, v, w) dS}{\iint dS} = \frac{\int_{\beta_1}^{\beta_2} \int_{\alpha_1}^{\alpha_2} D(\phi, \theta) \sin\theta d\phi d\theta}{[(\alpha_2 - \alpha_1)(\cos\beta_1 - \cos\beta_2)]} \tag{5}$$

where $$D(\phi, \theta) = (\sin\theta\cos\phi)^2 D_{xx} + (\sin\theta\sin\phi)^2 D_{yy} + (\cos\theta)^2 D_{zz} + \tag{6}$$
$$(\sin\theta)^2 \sin2\phi D_{xy} + \sin2\theta \cos\phi D_{xz} + \sin2\theta \sin\phi D_{yz}$$

is the expression of D(u, v, w) in the spherical coordinate, where $\phi$ is the azimuthal angle ranging from $\alpha_1$ to $\alpha_2$, $\theta$ is polar angle ranging from $\beta_1$ to $\beta_2$. By averaging over different spherical surfaces, each component of the 3D diffusion tensor is determined:

$$\begin{cases} D_{xy} = \frac{3\pi}{4}(D_{0,\pi/2,0,\pi} - D_{0,\pi,0,\pi}) \\ D_{yz} = \frac{3\pi}{4}(D_{0,\pi,0,\pi/2} - D_{0,\pi,0,\pi}) \\ D_{xz} = \frac{3\pi}{4}(D_{0,\pi/2,0,\pi/2} + D_{0,\pi,0,\pi} - D_{0,\pi/2,0,\pi} - D_{0,\pi,0,\pi/2}) \\ D_{xx} = (2\sqrt{2} + 2)D_{0,\pi,0,3\pi/4} - 2\sqrt{2} D_{0,\pi,0,\pi} - D_{0,\pi,0,\pi/2} + \frac{3\pi}{4}(D_{0,\pi/4,0,\pi} - D_{0,\pi/2,0,\pi}) \\ D_{yy} = (2\sqrt{2} + 2)D_{0,\pi,0,3\pi/4} - 2\sqrt{2} D_{0,\pi,0,\pi} - D_{0,\pi,0,\pi/2} - \frac{3\pi}{4}(D_{0,\pi/4,0,\pi} - D_{0,\pi/2,0,\pi}) \\ D_{zz} = (4\sqrt{2} + 3)D_{0,\pi,0,\pi} + 2D_{0,\pi,0,\pi/2} - (4\sqrt{2} + 4)D_{0,\pi,0,3\pi/4} \end{cases} \tag{7}$$

Results

LiFT-FRAP System for Noninvasive Fast 3D Diffusion Measurement

Using FRAP to noninvasively acquire 3D diffusion tensor measurements of biorelevant molecules in tissues requires high-speed volumetric image acquisition for recording the 3D fluorescence recovery process. Light sheet microscopy, which applies a thin sheet of light to illuminate the sample, while simultaneously capturing the emitted fluorescence from the illumination plane with a camera, is a good candidate. It has been proven to perform high-speed volumetric imaging in various biological systems.

Noninvasive 3D diffusion tensor measurement of fast diffusing molecules was achieved by the disclosed LiFT-FRAP data acquisition system and an accompanying 3D FRAP data analysis method. The LiFT-FRAP system, which integrates a two-photon 3D volume bleaching generator for confined 3D bleaching with a high-speed two-photon scanned light sheet microscope, allows fast volumetric image acquisition of the 3D fluorescence recovery process (FIG. 2A). Within the LiFT-FRAP system, a light sheet was generated and rapidly scanned to illuminate a 3D volume; a high-speed camera was used to capture the fluorescence signals; and an independent bleaching path was implemented to bleach a small 3D region at the center of illuminated 3D volume. The scanning apparatus and piezo stage in the LiFT-FRAP system were well-controlled to assure coordinated operation and high-quality 3D imaging. For each LiFT-FRAP experiment, both 3D pre-bleaching images and post-bleaching images were recorded. The 3D spatial Fourier transform method, which includes frequency domain data conversion, curve fitting, and tensor calculation, was applied to analyze the 3D image data and extract the 3D diffusion tensor (D), a 3×3 symmetric matrix ($D_{ij}=D_{ji}$) through a single FRAP experiment (FIG. 2B).

Compared to the volumetric imaging rate of 0.05 volumes per second in conventional spot-scanned two-photon microscopy, disclosed LiFT-FRAP systems can achieve an imaging rate of 8 volumes per second (160 times faster), enabling capture of rapid 3D fluorescence recovery with a time resolution of 125 ms (FIG. 2D). To validate the performance of LiFT-FRAP, the 3D diffusion tensors of standard fluorescent probes were determined in homogeneous solutions and compared the molecular diffusivity results with 2D FRAP measurements and theoretical predictions. Diffusion in homogeneous solutions is considered isotropic; therefore, the diffusivities attained from 2D and 3D experiments are directly comparable. According to the Stokes-Einstein equation, molecular diffusivity in homogenous solutions is determined by both solution viscosity and molecular size. First, the 3D diffusion tensors of sodium fluorescein (376 Da) in glycerol solutions were determined with different viscosities (glycerol concentrations 55%, 60%, 70%, and 80%). As anticipated, the 3D diffusion of sodium fluorescein was isotropic in all four solutions and diffusivity decreased as solution viscosity increased (FIG. 2F). With the exemplary setup, the maximum diffusivity measured using LiFT-FRAP was 51 $\mu m^2\ s^{-1}$, 100-fold higher than previously reported values of 0.5 $\mu m^2\ s^{-1}$, demonstrating the capacity of LiFT-FRAP to quantify rapid 3D diffusion for a variety of biomolecules. Notably, LiFT-FRAP yielded comparable diffusion results to both the 2D FRAP measurements as well as theoretical predictions (FIG. 2H). Next, the 3D diffusion tensors of fluorescein isothiocyanate-conjugated dextran (FD) molecules was measured with different molecular weights (4, 10 and 40 kDa) (FD4, FD10, and FD40) in 60% glycerol solution. As expected, the 3D diffusion for all FD molecules was isotropic and diffusivity decreased as molecular size (i.e., molecular weight) increased (FIG. 2G). The FD molecule diffusivities measured by LiFT-FRAP also agreed well with 2D FRAP values and theoretical predictions (FIG. 2I). These results demonstrate that LiFT-FRAP robustly achieves fast, accurate 3D diffusion tensor measurement.

LiFT-FRAP Allows Tunable 3D Diffusion Properties in Tissue Engineering Scaffolds.

Another application of LiFT-FRAP is measuring 3D diffusion properties in biomimetic scaffolds. Biomimetic scaffolds have shown great promise in the field of tissue engineering, as their structure can be tailored to recreate microenvironments suitable for tissue formation. While significant efforts have been devoted to promoting anisotropic mechanical properties of tissue engineering scaffolds, accurate characterization of scaffold 3D diffusion properties is needed to confirm their functional performance and further enhance their biological relevance. Moreover, a standard tool for 3D diffusion measurement is greatly needed to assure quality control in the industrial scaffold fabrication process. LiFT-FRAP was used to quantify the impact of scaffold composition and structure, as well as diffusing molecule size, on 3D diffusion in scaffolds. To test the effect of scaffold composition on 3D diffusion properties, the 3D diffusion in gelatin hydrogels was first measured. It was found that the 3D diffusion of FD70 was isotropic in all hydrogels and that diffusivity decreased as hydrogel concentration increased (FIG. 3A). These results agreed with the previous findings, demonstrating that LiFT-F RAP can characterize the influence of scaffold composition on 3D diffusion.

To delineate the relationship between material structure and molecular size on scaffold 3D diffusion, LiFT-FRAP was used to measure the 3D diffusion of two FD molecules with different molecular weights (10 and 20 kDa) similar to essential growth factors in two fiber-based scaffolds—one aligned, one random—fabricated by electrospinning (FIG. 3B). In fiber-aligned scaffolds (FIG. 3C), both probes exhibited 3D principal fiber direction (FIG. 3E), while in random fiber scaffolds (FIG. 3D), diffusion of both probes was isotropic (FIG. 3F). The structure coherency coefficient in fiber-aligned scaffolds was much higher than in random fiber scaffolds (FIG. 3G). Consequently, diffusion anisotropy in fiber-aligned scaffolds was much higher (FIG. 3H), supporting the notion that structure anisotropy leads to diffusion anisotropy. These results reveal 3D anisotropic diffusion properties in tissue engineering scaffolds. In assessing the influence of molecular size on scaffold 3D diffusion, FD10 showed faster diffusivity than FD20 in both fiber-aligned and random fiber scaffolds (FIG. 3E, FIG. 3F) as FD10 has a smaller molecular size compared to FD20. The increased diffusion anisotropy observed with FD20 in fiber-aligned scaffolds (FIG. 3H) further suggests that large molecule diffusion is more sensitive to tissue structure due to its higher directional dependence in physical interactions with oriented fibers. These results demonstrate the capacity of LiFT-FRAP for noninvasively measuring 3D diffusion of biorelevant molecules. As a sensitive tool for quantifying the impact of scaffold composition and structure, as well as molecular size, on 3D molecular diffusion in tissue engineering scaffolds, LiFT-FRAP can be used to guide scaffold development to recapitulate functional tissues, as well as to standardize scaffold fabrication and quality.

LiFT-FRAP Quantifies 3D Diffusion Changes in a Tendon Disease Model.

Applying LiFT-FRAP to quantify the 3D diffusion behavior in biological tissues provides a more thorough understanding of the tissue pathophysiology. Currently, pathophysiology studies are mainly focused on the changes in tissue structures or mechanical properties. The investigation on 3D diffusion lags behind mechanical studies even though it is well known that molecular diffusion is important to tissue functions. In this application, the 3D diffusion of a small probe molecule, sodium fluorescein (376 Da), was characterized in both healthy and pathological rat tail tendons. Results show that the 3D diffusion of sodium fluorescein in healthy tendons was strongly anisotropic, with the fastest diffusion along the fiber direction (FIG. 4A, FIG. 4B). These results are consistent with a recent study showing 3D anisotropic diffusion in porcine tendons but with a larger probe, 70 kDa FD (FD70), and much slower extracellular diffusivity. To quantify the 3D diffusion response to pathological tissue changes, LiFT-FRAP was applied to a thermal treatment model, as it has been reported that thermally treating collagenous tissues at temperatures over 65° C. will start to denature the collagen fibers causing pathology-mimicking changes in tissue composition and structure. Fresh tendons were treated at 70° C. during the sodium fluorescein staining process and it was found that the tendons were partially denatured after a period of 5 minutes and fully denatured for 30 minutes, as demonstrated by SHG imaging and picrosirius red staining with and without polarized light (FIG. 4B, FIG. 4C). Results showed that the diffusion of sodium fluorescein was highly anisotropic in healthy tendons, but isotropic in both thermally treated tendons (FIG. 4A). Compared to healthy tissues, the 3D diffusion anisotropy of thermally treated tissues was significantly decreased as treatment time increased in a dose-dependent manner (FIG. 4D). Correspondingly, the structure coherency coefficient in treated groups was also significantly decreased in a dose-dependent manner (FIG. 4E). In addition, overall probe diffusivity increased as the duration of thermal treatment increased (FIG. 4A), which correlates with increased tendon water content throughout the thermal treatment process (FIG. 4F). These results demonstrate LiFT-FRAP is a robust technique for 3D diffusion measurement in biological tissues. By quantifying 3D diffusion variations in biological tissues caused by pathological composition and structural changes, LiFT-FRAP is expected to provide crucial insights into disease mechanisms at the molecular level.

LiFT-FRAP Reveals Misrepresentation of Extracellular Diffusion in Cornea Tissues by Invasive 2D Measurement.

Having demonstrated that LiFT-FRAP is a robust tool for fast 3D diffusion tensor measurement, this noninvasive LiFT-FRAP technique was applied to identify 3D diffusion properties in cornea tissues (FIG. 5A). We also performed 2D FRAP measurements in exercised cornea sections (FIG. 5B) to reveal how the invasive dissection procedures altered the diffusion measurement results, therefore demonstrating the necessity of the noninvasive LiFT-FRAP technique. Since cornea tissues are subjected to tensile stress exerted by the intraocular pressure under physiological conditions, the invasive dissection procedure involved in the 2D FRAP study will unwittingly release the mechanical stress, therefore resulting in tissue structure changes. Second-harmonic generation (SHG) imaging of the collagen structure in intact eyeballs and exercised cornea sections confirmed such structure changes caused by tissue dissection: Collagen fibers were wavier and more crimped in exercised cornea sections than in intact eyeballs (FIG. 5C). Morphology analysis with the SHG images showed that the structure coherency coefficient, a morphometric indicator of structural anisotropy, was lower in dissected cornea sections than in intact eyeballs (FIG. 5D). Moreover, no significant difference was found in structure coherency coefficients in intact eyeballs after CXL treatment, while the structure coherency coefficient was significantly increased in CXL cornea sections than native cornea sections (FIG. 5D). These results demonstrate the changes of tissue structural integrity due to invasive tissue sectioning, which raised concerns about the accuracy of 2D measurements in characterizing the cornea diffusion properties.

Using LiFT-FRAP, it is possible to noninvasively access cornea 3D diffusion properties under physiological conditions. First, in situ LiFT-FRAP measurements were conducted in fresh native porcine eyeballs to examine whether the extracellular diffusion in native corneas is isotropic or anisotropic. LiFT-FRAP results revealed that the in situ diffusion of 20 kDa FD (FD20) in native corneas was indeed highly 3D anisotropic, with the slowest diffusion along the anteroposterior direction and no significant difference between the mediolateral and superoinferior directions (FIG. 5E). Such 3D diffusion anisotropy is correlated with the anisotropic collagen lamellae structure of cornea tissues, with the lamellae layers stacked in the anteroposterior direction, showing that solutes diffuse more slowly in the direction perpendicular to the lamellae structure (FIG. 5C). The direction of fibers within adjacent cornea lamellae are largely perpendicular to each other, so it can be assumed that the overall fiber alignment in the transverse plane is random within the imaging volume with comparable diffusion along with the mediolateral and superoinferior directions parallel to the lamellae layer. In situ LiFT-FRAP measurements were also performed in CXL porcine eyeballs to identify the exact impact of CXL treatment on cornea diffusion properties and thus tissue function. LiFT-FRAP results showed that overall 3D diffusion of FD20 was slower but remained anisotropic in CXL corneas, with the slowest diffusion in the anteroposterior direction (FIG. 5E). This result was expected, for CXL corneas exhibited lamellae structure similar to native corneas, as shown in SHG images (FIG. 5C). Yet surprisingly, it was found that the magnitude of 3D diffusion anisotropy was significantly lower in CXL corneas than native corneas (FIG. 5F), while the structural anisotropy showed no difference between CXL and native corneas (FIG. 5D). The diffusivities after CXL treatment decreased more dramatically in the mediolateral and superoinferior directions (parallel to the lamellae) compared to the anteroposterior direction (perpendicular to the lamellae). This difference might result from the more compact lamellae in CXL corneas, as evidenced by their decreased cornea thickness. This compactness could impose greater impedance to molecular diffusion in directions parallel to the lamellae, reducing the difference among the diffusivities and resulting in decreased diffusion anisotropy in CXL corneas. In contrast, 2D FRAP measurements in sectioned tissues found no significant difference in overall diffusivity between native and CXL groups (FIG. 5G). The solute diffusivity was also much slower than the value measured by LiFT-FRAP, partially owing to the use of viscous Dextran solution for the prevention of cornea sections from tissue swelling. Additionally, although anisotropic diffusion was found in both native and CXL groups (FIG. 5G), 2D FRAP results showed that the diffusion anisotropy is slightly higher in CXL sections than in native sections (FIG. 5H), which is opposite from the significantly decreased diffusion anisotropy seen in LiFT-FRAP results (FIG. 5F). Similar results were also obtained from 2D FRAP measurements with another molecule, sodium fluorescein, showing no significant changes in overall diffusivity but significantly increased diffusion anisotropy in CXL sections (FIG. 5I, FIG. 5J). The diffusion anisotropy changes after CXL treatment measured through 2D FRAP (FIG. 5H, FIG. 5J) followed the same trend of structural anisotropy changes measured from cornea sections (FIG. 5D), which suggests the structural changes caused by the invasive sectioning of the 2D approach could interfere with the detection of the actual diffusion changes in vivo.

To determine how the invasive 2D FRAP measurements impact the cornea in vivo physiology, a computational model based on human cornea geometry was simulated (FIG. 6A). Results showed that a much lower molecular concentration was predicted and a longer time was needed to reach a certain molecular concentration at the posterior cornea when the 2D FRAP results were applied to simulate the molecular distribution (FIG. 6B, FIG. 6C, FIG. 6D). Moreover, the use of 2D FRAP results downplayed the impact of CXL on the molecular distribution in cornea tissues. With the LiFT-FRAP results, the difference in the molecular distribution between native and CXL corneas can be seen (FIG. 6B, FIG. 6C, FIG. 6D). However, very minor CXL influence on the concentration profile was found with the 2D FRAP results (FIG. 6B, FIG. 6C, FIG. 6D) which could lead to misunderstanding of treatment efficacy. These results demonstrate that 2D FRAP measurement on dissected tissue sections is not a reliable approach to recapitulate the 3D biomolecular transport in cornea tissues in vivo. Using LiFT-FRAP, the baseline in situ diffusion properties in cornea tissues was quantified, therefore addressing the longstanding questions regarding molecular transport behavior in cornea tissues. With the ability to characterize the effects of CXL on cornea 3D diffusion properties, LiFT-FRAP provides a key dimension beyond biomechanics for evaluating CXL safety and efficacy, and crucial insight into further improving clinical outcomes. These results further highlight the necessity of noninvasive 3D diffusion measurement tools, and the power of LiFT-FRAP to elucidate tissue physiology, pathophysiology, and intervention outcomes.

While certain embodiments of the disclosed subject matter have been described using specific terms, such description is for illustrative purposes only, and it is to be understood that changes and variations may be made without departing from the spirit or scope of the subject matter.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only and is not intended to limit the invention further described in the appended claims.

What is claimed is:

1. A data acquisition system comprising:
   a first laser configured to transmit an illumination beam along an illumination path and direct the illumination beam to irradiate a 3D volume of a sample area;
   a bleaching unit configured to direct a bleaching beam along a bleaching path and contact a portion of the 3D volume of the sample area with the bleaching beam; and
   a sensor configured to detect a first series of emissions emitted within the 3D volume corresponding to a 3D illumination response signal and a second series of emissions emitted within the 3D volume at a later time and corresponding to a 3D bleached signal; wherein
   analysis of the first series of emissions and the second series of emissions provides a full 3D diffusion tensor of a molecular species retained in the sample area.

2. The data acquisition system of claim 1, further comprising an imaging unit.

3. The data acquisition system of claim 2, wherein the imaging unit is a nonlinear optical imaging unit.

4. The data acquisition system of claim 2, wherein the imaging unit utilizes the bleaching beam.

5. The data acquisition system of claim 2, wherein the imaging unit comprises a dedicated imaging beam source.

6. The data acquisition system of claim 1, further comprising a beam splitter configure to split an emission from the first laser to form the illumination beam and the bleaching beam.

7. The data acquisition system of claim 1, further comprising a second laser configured to transmit the bleaching beam.

8. The data acquisition system of claim 1, wherein the illumination path includes a MEMS mirror.

9. The data acquisition system of claim 1, wherein the bleaching unit comprises elements to control relative movement of the bleaching beam within the 3D volume and define the portion of the 3D volume contacted by the bleaching beam.

10. The data acquisition system of claim 9, the elements comprising a stage movable in a z-axis and/or a scanner configured to scan the bleaching beam in an xy-plane.

11. The data acquisition system of claim 1, wherein the illumination path includes an illumination shutter configured to adjust an operation state to prevent or allow transmission of the illumination beam to the sample area and/or wherein the bleaching path includes a bleaching shutter configured to adjust an operation state to prevent or allow transmission of the second beam to the sample area.

12. The data acquisition system of claim 1, further comprising a computing system that includes one or more processors and a memory comprising one or more non-transitory computer-readable memory that together store instructions that when executed by the one or more processors cause the computing system to perform operations, the operations comprising the analysis of the first series of emissions and the second series of emissions.

13. The data acquisition system of claim 12, the analysis including a 3D spatial Fourier analysis.

14. The data acquisition system of claim 1, wherein the first series of emissions comprise a first series of individual 2D light sheet emissions scanned along an orthogonal direction and the second series of emissions comprise a second series of individual 2D light sheet emissions scanned along the orthogonal direction.

15. A non-invasive method for determining a 3D diffusion tensor for a molecular species in a material, the method comprising:
   irradiating a 3D volume comprising the molecular species in the material with an illumination beam;
   bleaching a portion of the 3D volume with a bleaching beam;
   obtaining emission data from the 3D volume, wherein the emission data comprises a first series of emissions generated by the material upon exposure of the volume to the illumination beam and comprises a second series of emissions generated by the material after exposure of the portion of the volume to a bleaching beam;
   analyzing the emission data, the analysis comprising a 3D spatial Fourier analysis of the emission data; and
   determining, based at least in part on the 3D spatial Fourier analysis, a full 3D diffusion tensor for the molecule in the material.

16. The method of claim 15, wherein irradiating the 3D volume with the illumination beam comprises scanning the volume with a 2D sheet of the illumination beam along an orthogonal direction across the volume of the material to obtain the first series of emissions.

17. The method of claim 15, wherein the material is derived from a biological organism, biomaterial, and/or a solution.

18. The method of claim 15, wherein the molecule comprises a fluorescing group.

19. The method of claim 15, wherein determining the full 3D diffusion tensor for the molecule comprises solving:

$$\frac{\hat{C}(u, v, w, t)}{\hat{C}(u, v, w, 0)} = \exp[-4\pi^2(u^2 + v^2 + w^2)D(u, v, w)t], \text{ wherein } D(u, v, w) =$$

$$\frac{u^2 D_{xx} + v^2 D_{yy} + w^2 D_{zz} + 2uv D_{xy} + 2uw D_{xz} + 2vw D_{yz}}{u^2 + v^2 + w^2},$$

and wherein $\hat{C}(u, v, w, t) = \int_{-\infty}^{\infty}\int_{-\infty}^{\infty}\int_{-\infty}^{\infty} C(x, y, z, t)e^{-2\pi i(ux+vy+wz)}dxdydz$.

20. The method of claim 15, wherein the step of determining the full 3D diffusion tensor for the molecule comprises obtaining normalized emission data by adjusting the second series of emission based on the first series of emissions.

21. The method of claim 20, wherein the 3D spatial Fourier analysis of the emission data utilizes the normalized emission data.

22. The method of claim 15, wherein the step of determining the full 3D diffusion tensor for the molecule is independent of a shape of the bleached portion of the 3D volume.

* * * * *